(12) United States Patent
Braedt et al.

(10) Patent No.: US 11,780,532 B2
(45) Date of Patent: Oct. 10, 2023

(54) ELECTROMECHANICAL DERAILLEUR FOR COAXIAL ASSEMBLY

(71) Applicant: SRAM DEUTSCHLAND GmbH, Schweinfurt (DE)

(72) Inventors: Henrik Braedt, Dittelbrunn-ot Hambach (DE); Heiko Redecker, Dittelbrunn (DE)

(73) Assignee: SRAM DEUTSCHLAND, GmbH, Schweinfurt (DE)

( * ) Notice: Subject to any disclaimer, the term of this patent is extended or adjusted under 35 U.S.C. 154(b) by 96 days.

(21) Appl. No.: 17/412,519

(22) Filed: Aug. 26, 2021

(65) Prior Publication Data

US 2022/0063763 A1 Mar. 3, 2022

(30) Foreign Application Priority Data

Sep. 3, 2020 (DE) .................... 10 2020 005 402.1
Jul. 21, 2021 (DE) .................... 10 2021 003 745.6

(51) Int. Cl.
*B62M 9/1248* (2010.01)
*B62M 9/122* (2010.01)

(52) U.S. Cl.
CPC .......... *B62M 9/1248* (2013.01); *B62M 9/122* (2013.01)

(58) Field of Classification Search
CPC ............................ B62M 9/1248; B62M 9/122
USPC ........................................................ 474/80
See application file for complete search history.

(56) References Cited

U.S. PATENT DOCUMENTS

| | | | | |
|---|---|---|---|---|
| 9,039,551 B2* | 5/2015 | Bohm | ........... | B62M 9/1244 474/82 |
| 2005/0215368 A1* | 9/2005 | Hoe | ........... | B62M 9/126 474/80 |
| 2013/0130853 A1* | 5/2013 | Bohm | ........... | B62M 9/124 474/80 |
| 2013/0303317 A1 | 11/2013 | Sota | | |
| 2015/0111675 A1* | 4/2015 | Shipman | ........... | B62M 9/122 474/82 |
| 2016/0176478 A1* | 6/2016 | Chang | ........... | B62M 9/126 474/69 |
| 2020/0062344 A1* | 2/2020 | Liao | ........... | B62M 9/1242 |

FOREIGN PATENT DOCUMENTS

| | | |
|---|---|---|
| CN | 203727600 U | 7/2014 |
| DE | 102011118912 A1 | 5/2013 |
| DE | 102018005063 A1 | 12/2018 |
| DE | 102018208053 A1 | 1/2019 |
| DE | 102018206104 A1 | 10/2019 |
| EP | 0875444 A1 | 11/1998 |
| EP | 1342658 A1 | 9/2003 |
| EP | 1764297 A1 | 3/2007 |
| EP | 2891601 A1 | 7/2015 |

* cited by examiner

Primary Examiner — Gene O Crawford
Assistant Examiner — Emily R Kincaid

(57) ABSTRACT

The disclosure relates to an electromechanical rear derailleur for coaxial assembling on a rear wheel axle. The derailleur has a base element, a pivot mechanism, and a movable element having a chain guide assembly. The chain guide assembly is connected to the movable element so as to be rotatable about a rotation axis. A blocking device permits the chain guide assembly to be established relative to the movable element. The blocking device is able to be inserted into the movable element in two different positions.

15 Claims, 43 Drawing Sheets

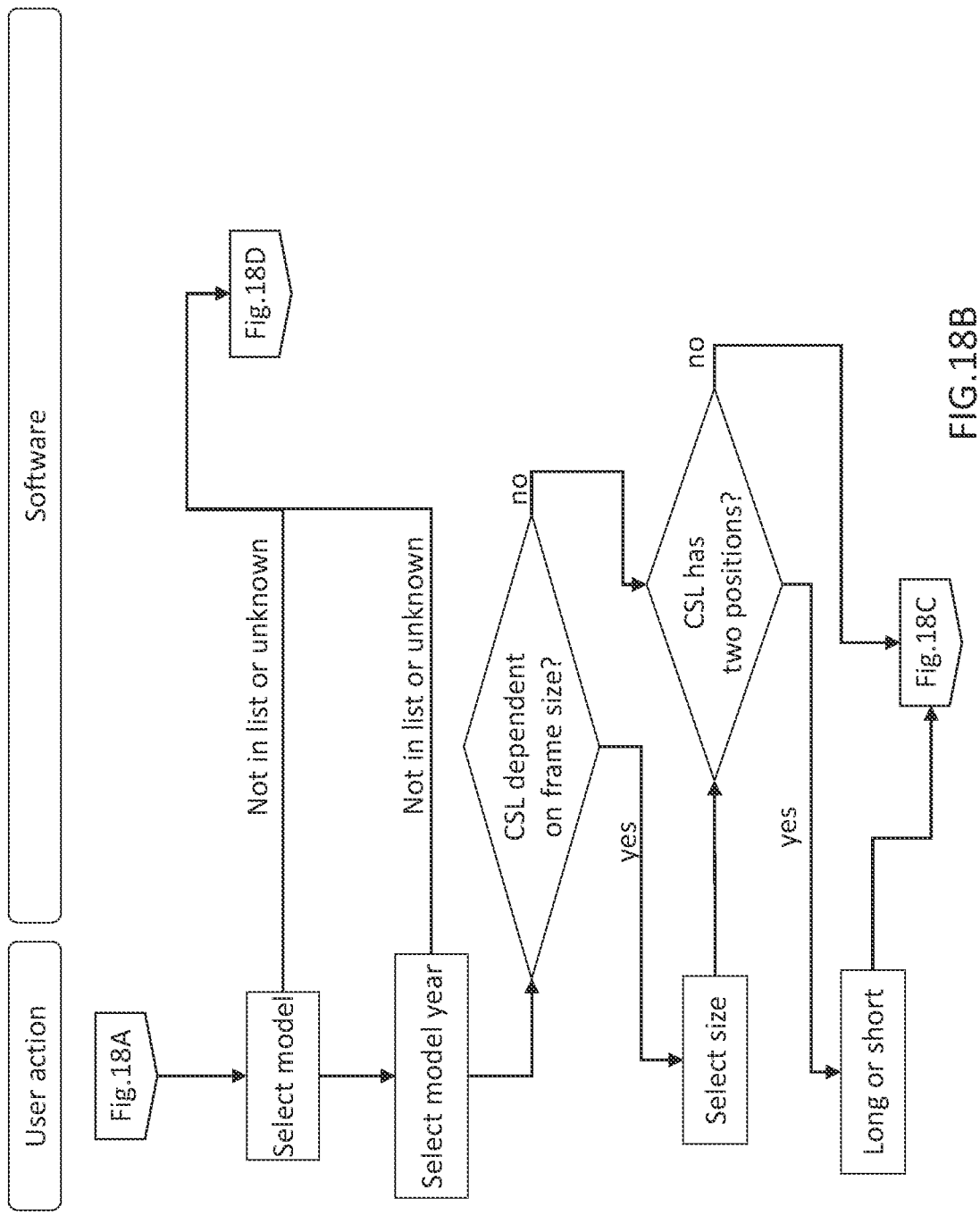

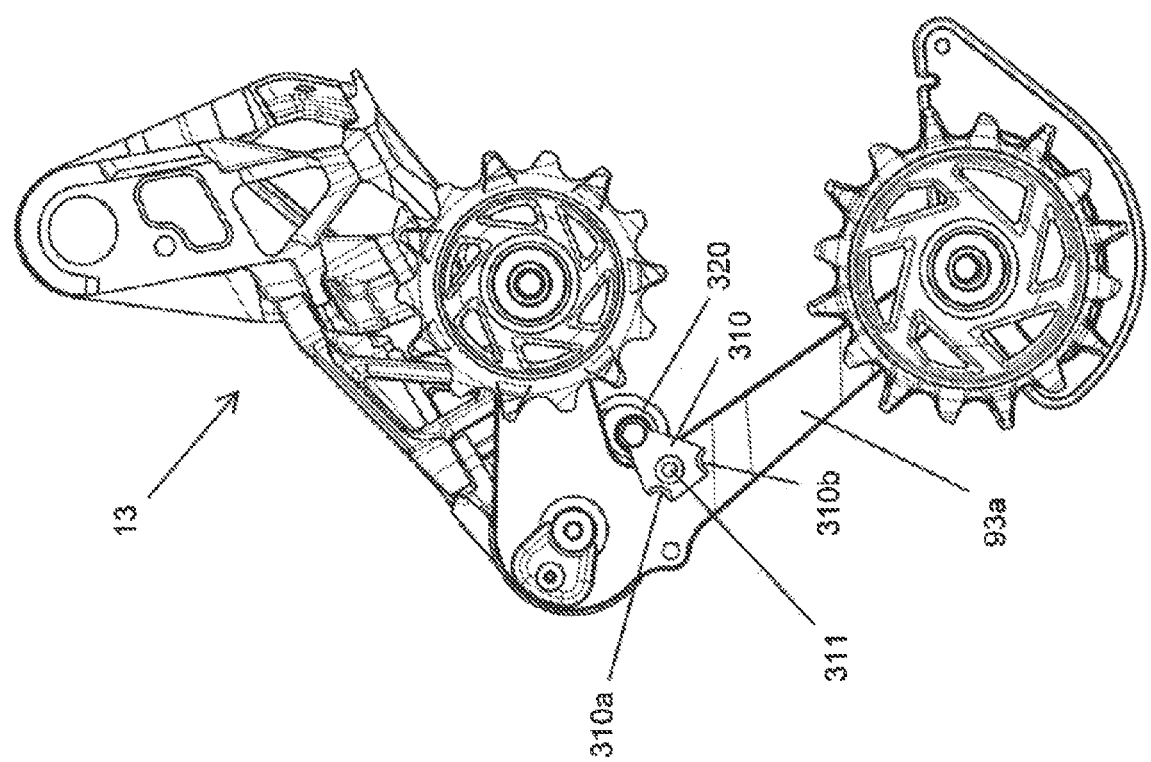

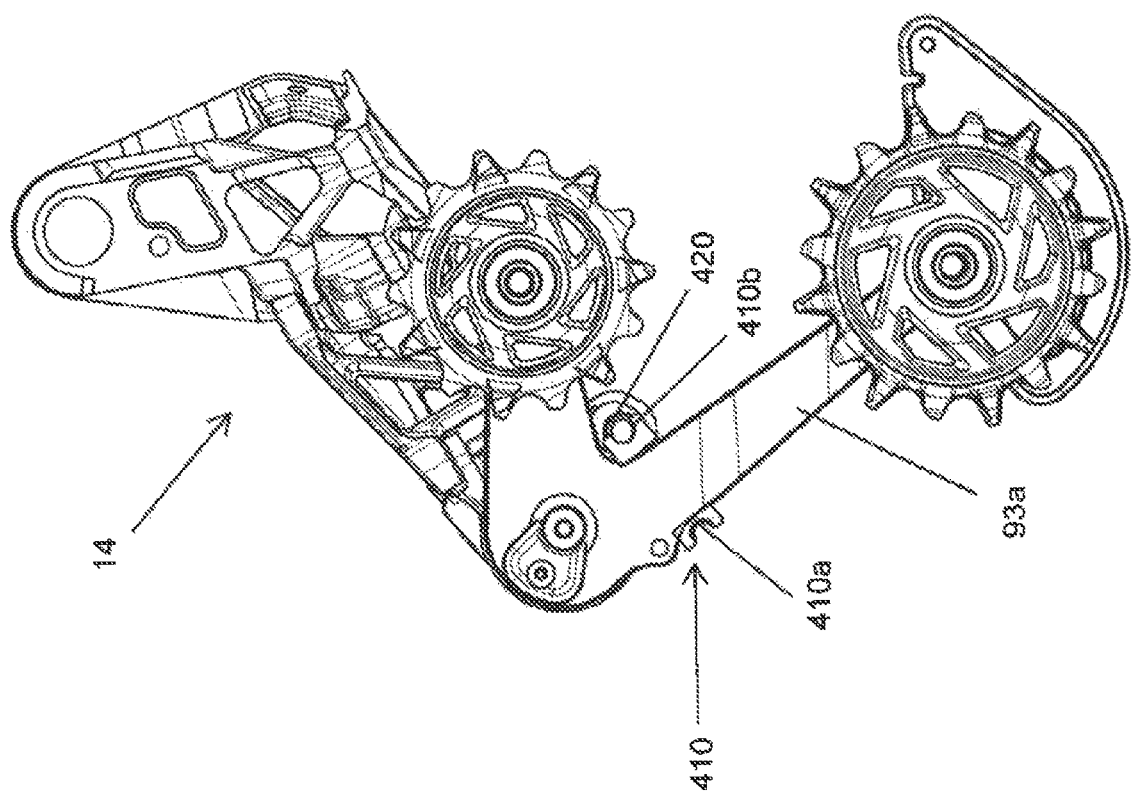

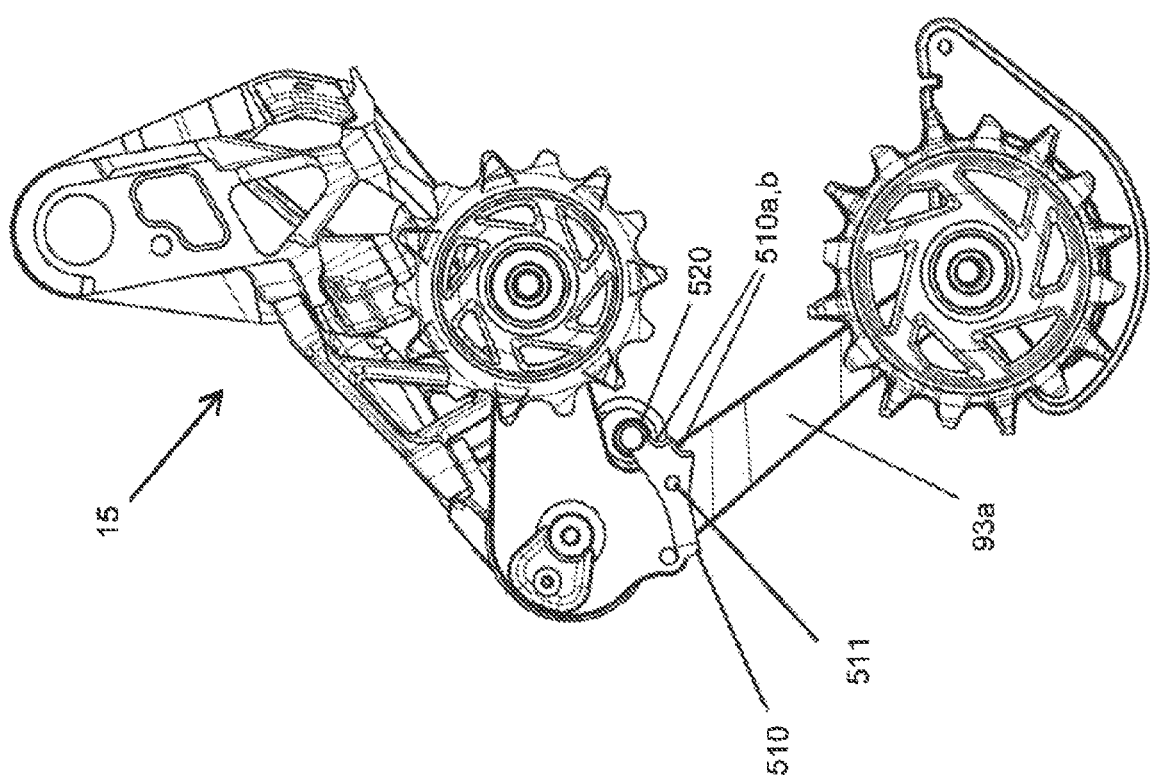

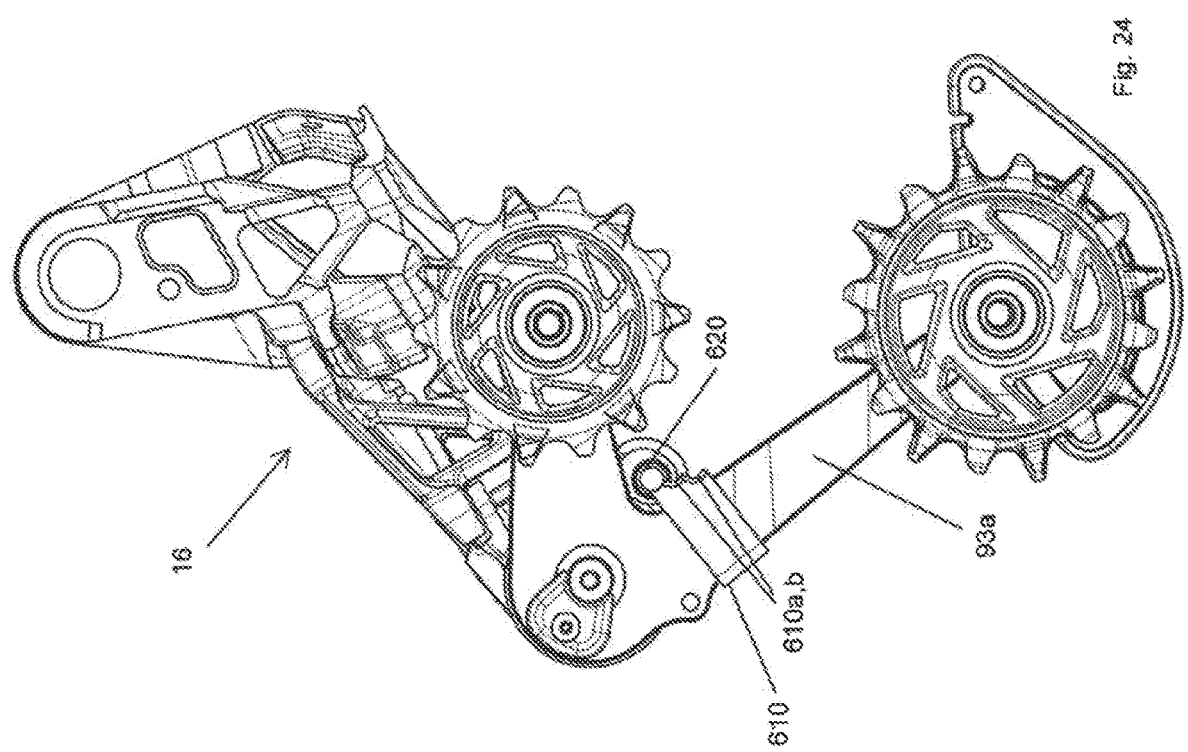

ELECTROMECHANICAL DERAILLEUR FOR COAXIAL ASSEMBLY

PRIORITY

This application claims priority to, and/or the benefit of, German patent application DE 10 2020 005 402.1, filed on Sep. 3, 2020, and DE 10 2021 003 745.6, filed on Jul. 21, 2021, the contents of both DE 10 2020 005 402.1 and DE 10 2021 003 745.6 are included by reference herein in their entirety.

BACKGROUND

Rear derailleurs are usually fastened to the right dropout of the frame with the aid of a derailleur hanger. The derailleur hanger for this purpose is established on the frame at one end so as to be coaxial with the rear wheel axle, and at another end connected so as to be coaxial with the B-axis of the base element (B-knuckle) of the derailleur. The spacing between the geometrical axis A of the rear wheel axle and the B-axis of the base element is bridged by the derailleur hanger. The base element in the state assembled on the frame is rotatable relative to the derailleur hanger about the B-axis. The rotation of the derailleur towards the front, in the anti-clockwise manner, is delimited by the B-screws. The rotation of the derailleur towards the rear, in the clockwise manner, is counteracted by the chain tension.

Mechanical derailleurs for coaxial assembling on the rear wheel axle are known from EP 0 875 444 A1, EP 1 342 658 A1, and EP 1 764 297 A1. The separate derailleur hanger is dispensed with and the B-axis of the base element runs along the rear wheel axle A, thus coaxial with the latter.

Sprocket packs possess a gear spread of 500 percent or more. Such gear spreads can be achieved using a smallest sprocket with 9, 10 or 11 teeth, and a largest sprocket with 50, 51, 52 teeth or more.

In order for the increased number of sprockets to be able to be operated by the derailleur, the dimension of the derailleur is enlarged.

Obliquely positioned pivot mechanisms (oblique parallelogram) can lead to shocks in the vertical direction, as arise when riding in the terrain, to a movement of the pivot mechanism and thus to unintentional shifting procedures (ghost shifting). In order for the sprockets of dissimilar sizes to be able to be approached, the oblique parallelogram would have to be positioned even more obliquely, and/or the dimensions of the derailleur would have to be further enlarged. Both would further increase the susceptibility to unintentional shifting procedures.

The spacing between the upper chain roller of a derailleur and the sprocket below which the chain roller is positioned is referred to as the B-gap or the chain gap. In the development of a chain derailleur, an ideally constant profile of the B-gap is generally pursued. This profile curve is derived from the interaction of different geometric parameters such as, for example, the parallelogram geometry (pivot mechanism), the spacing of the parallelogram from the rear wheel axle A, the angle of the parallelogram in relation to the connecting plane axle—bottom bracket axle (B-angle), the spacing of the P-knuckle axle (P-axle) from the parallelogram, the cage geometry, the size of the chain rollers, the transmission spectrum of the sprocket cassette, etc.

It has been demonstrated that a precise initial adjustment of the B-gap has a particularly strong influence on the ruggedness and shifting performance. Only very inaccurate results can be achieved in practice using the customary method of adjusting the B-gap. Problematic here are above all the absence of a reference and the adjustment process which is too complex for less experienced users. The use of B-gap templates is helpful here but, by virtue of application errors, often leads to results which are not optimal.

A coaxial derailleur attachment having an adjustable detent element permits a defined locking action between the chain guide assembly (cage) and the moveable element (P-knuckle) and enables the B-gap to be adjusted in a simple, rapid and very accurate manner.

However, a further set of issues has emerged in practice. In the case of frame's having a rear wheel suspension, the rear assembly geometry changes during compression, this having corresponding effects on the B-gap inter alia by virtue of length variations of the chain stays and variations of the B-angle. For this reason, the B-gap to date has had to be adjusted in the sag position. The rear assembly is completely compressed in the sag position. To this end, the rear assembly has to be correspondingly loaded so that two people or other means are required for the adjustment, said means being, for example, release of damper air, removal of the damper, compressing by auxiliary means such as a tie-down strap, for example.

A rear derailleur having an integrated display, or a marking on the chain guide is known from DE 10 2018 208 053 A1. The marking on the derailleur has the same function as a B-gap template, having the advantage that no further parts are required. The marking shows the correct spacing of the upper chain roller relative to the external circumference of the largest sprocket of a multi-sprocket assembly (B-gap). In this embodiment it is however disadvantageous that the marking only indicates a single adjustment position of the derailleur relative to the multi-sprocket assembly. This means that the derailleur is always adjusted to the same adjustment position regardless of the category of bicycle (fully suspended or hardtail). There is no possibility of varying the adjustment position depending on the bicycle category. Accordingly, fully suspended bicycles to date could only be adjusted in the sag position, thus when completely compressed.

SUMMARY

According to one aspect, a rear derailleur for a bicycle gearshift mechanism, includes: a base element attachable to a bicycle frame; a movable element coupled to the base element and repositionable relative to the base element; a chain guide assembly coupled to the movable element and pivotable relative to the moveable element about a pivot axle; a pre-tensioning installation configured to pre-tension the chain guide assembly relative to the movable element about the pivot axle to an initial setting, where the chain guide assembly, counter to a tensioning force of the pre-tensioning installation, is pivotable from the initial setting about the pivot axle to various operating settings; and at least one blocking device for blocking the chain guide assembly in at least one blocking setting, deviating from the initial setting, relative to the movable element, where the at least one blocking device has a blocking element which is repositionable between a passive setting in which said at least one blocking device releases the chain guide assembly relative to the movable element, and at least one active setting in which the at least one blocking device holds the chain guide assembly in the at least one blocking setting.

According to another aspect, a method for adjusting a bicycle drive including a rear derailleur, a multi-chain wheel assembly, a front chainring and a chain, where the rear derailleur is adjusted relative to the multi-chain wheel assembly, the method includes: determining a bicycle category; depending on the bicycle category, shifting to a reference sprocket, such that the chain engages with the reference sprocket; depending on the bicycle category, selecting an adjustment position and adjusting the at least one blocking device to a first, second or third position; repositioning the blocking device to an active setting such that a chain guide assembly is established relative to a movable element of the rear derailleur; and rotating the rear derailleur rearward about a rear wheel axle until an ideal chain tension is achieved.

BRIEF DESCRIPTION OF DRAWINGS

FIG. 18B shows a second enlarged portion from FIG. 18 (center left);

FIG. 21 shows the derailleur having a third embodiment of the blocking device;

FIG. 22 shows the derailleur having a fourth embodiment of the blocking device;

FIG. 23 shows the derailleur having a fifth embodiment of the blocking device;

FIG. 24 shows the derailleur having a sixth embodiment of the blocking device;

Other aspects and advantages of the embodiments disclosed herein will become apparent upon consideration of the following detailed description, wherein similar or identical structures have similar reference numerals.

DETAILED DESCRIPTION

Figure 1:
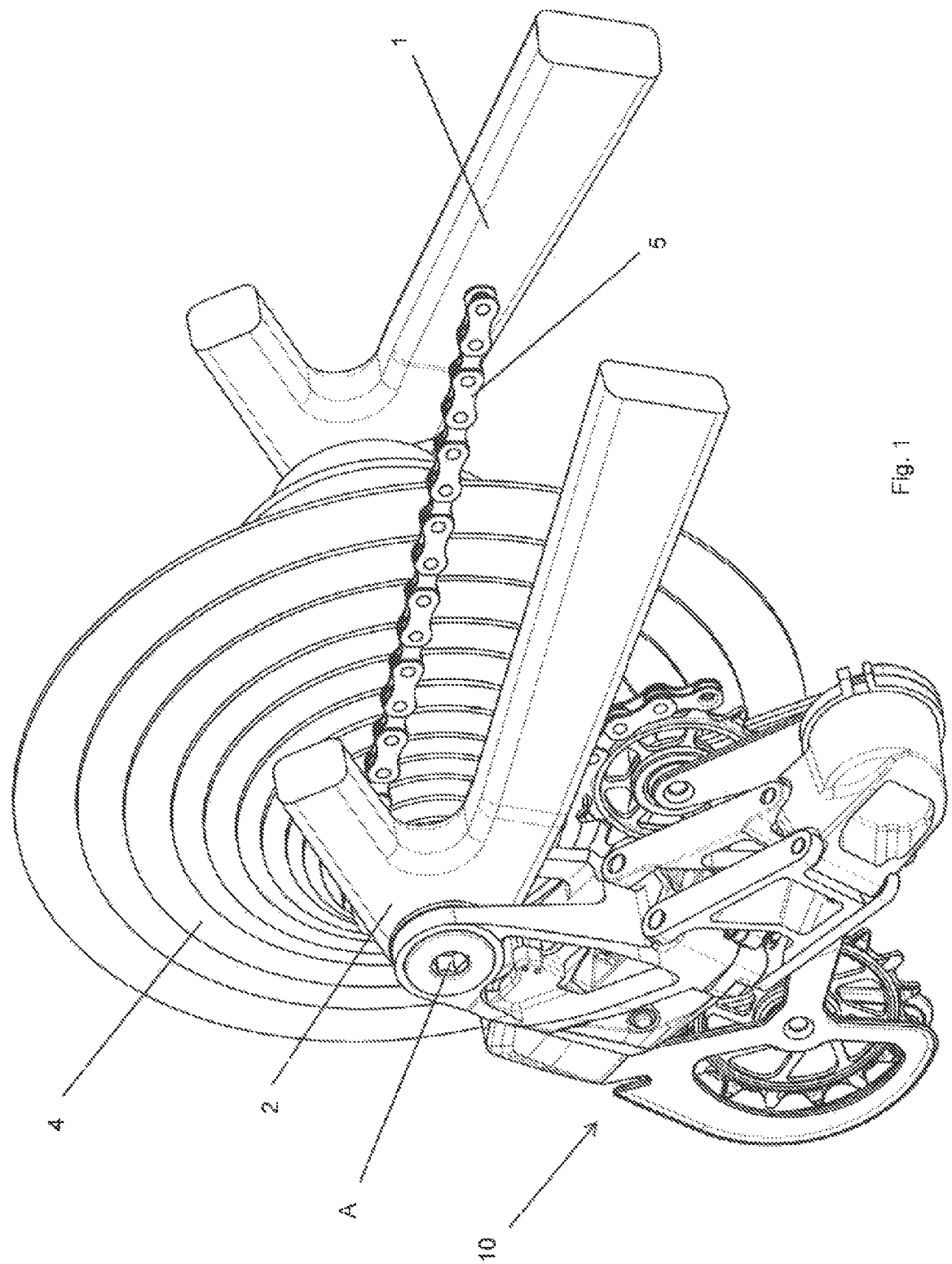
FIG. 1 shows a schematic partial illustration of a rear wheel assembly having an electromechanical derailleur assembled on a bicycle frame.

The disclosure relates to a rear derailleur, in particular to an electromechanical derailleur for coaxial assembling on a rear wheel axle. It is an object of the disclosure to make available a derailleur which can be easily assembled and adjusted.

The derailleur according to the disclosure, having a blocking device, solves the problem in that there is at least one second locking possibility between the cage and the P-knuckle, this at least one second locking position serving as sag compensation.

In order for the different categories of bicycles (for example fully suspended, hardtail) to be covered, the blocking device has to be able to be moved to different positions. The blocking device can be configured either as a flip chip (rotatable by 180 degrees) or interact with a plurality of locking openings in the cage. Two or three adjustment positions have in particular proven advantageous.

The various embodiments of the disclosure are derived from the claims and the description of the FIGS.

A further embodiment of the disclosure has only one locking possibility. The locking position is chosen such that a defined sprocket position is used for the adjustment in the case of bicycles without suspension. A further (adjacent) sprocket position is used for the adjustment with sag compensation.

A further aspect of the disclosure relates to a method for assembling and adjusting the derailleur. The methods are described in the context of FIGS. 18 and 19. These methods, or individual steps, respectively, could also be carried out when facilitated by an application software (app).

To this end, the category of bicycle is first determined. Depending on the category of the bicycle, a specific chain length has to be chosen, for example, and the blocking device has to be inserted in the first position or the second position.

The directional indications "front/rear", "outside/inside", "top/bottom" and "left/right" used hereunder relate to a bicycle which is aligned and used in the direction of travel. The bicycle frame 1 has a left and right dropout 2, a rear wheel (not shown here) being assembled therebetween. The rear wheel conjointly with the sprocket pack 4 rotates about the rear wheel axle A. The sprocket pack 4 is schematically illustrated and rotates about the rear wheel axle A. Such a sprocket pack 4 can comprise, for example, 12 sprockets, wherein the smallest sprocket has ten teeth and the largest sprocket has 52 teeth.

The electromechanical derailleur 10 is assembled on the right dropout 2. When shifting from a larger sprocket to a smaller sprocket, the rear derailleur 10 moves the chain 5 axially outwards (outboard). When shifting from a smaller sprocket to a larger sprocket, the rear derailleur 10 moves the chain 5 axially inwards (inboard). Axial refers to the rear wheel axle A, or to the rotation axis A of the multi-sprocket assembly 4. The larger sprocket in axial terms lies further inward than the smaller sprockets. The teeth are disposed so as to be radially outside on the sprockets. The chain 5 passes in an S-shaped manner through the chain guide assembly and engages with the teeth of the upper chain guide roller and the lower chain guide roller as well as with the teeth of the sprocket pack 4 that are not shown here.

The bicycle drive shown in FIG. 1 comprises a front single chain wheel, not shown, the rear sprocket pack 4, a chain 5, and the rear derailleur 10. Shifting signals are sent from a switch (not shown here) assembled on the handlebar to the electromechanical derailleur 10. The transmission of the shifting signals from the switch to the derailleur 10 takes place wirelessly. A transmission of the shifting signals by a wire would be likewise conceivable. The blocking device according to the disclosure can be equally well applied together with a mechanical derailleur as well as an electromechanical derailleur.

FIG. 1 shows a perspective external view of an embodiment of the rear derailleur 10 assembled on the right dropout 2 of the frame 1.

Figure 2:
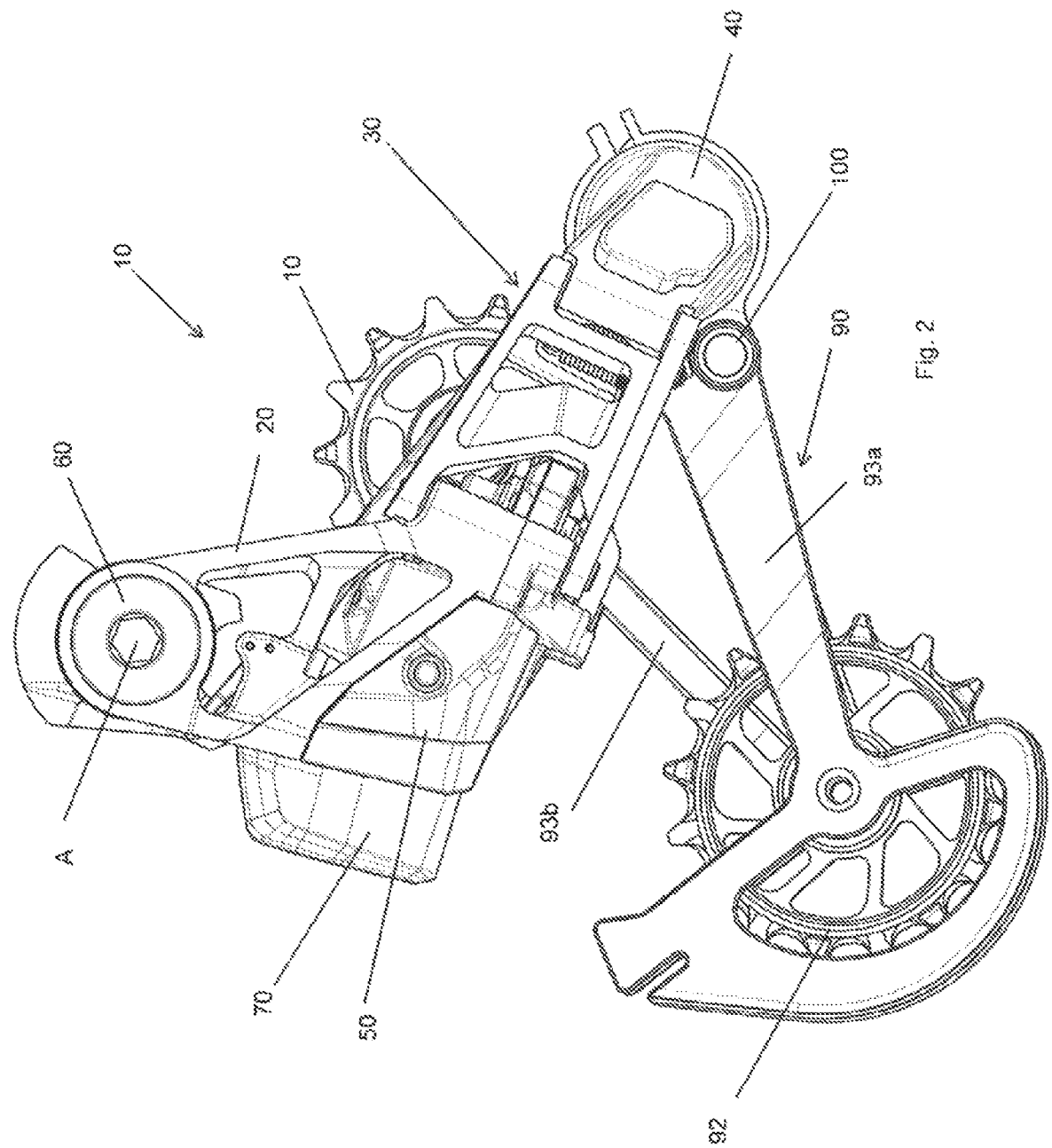
FIG. 2 shows an external view of the derailleur.

FIG. 2 shows only the derailleur 10 in the external view. The coaxial assembling of the derailleur 10 by pins 60 along the rear wheel axle A, or the B-axis of the base element 20, respectively, dispenses with the use of a derailleur hanger.

The chain guide assembly 90 is connected to the movable element 40 so as to be rotatable about the pivot axle 41 (P-axle) and is pre-tensioned in the clockwise manner (towards the rear) so that the chain is tensioned. The chain guide assembly 90 comprises an upper chain guide roller 91 and a lower chain guide roller 92 which are in each case mounted so as to be rotatable between two cage plates 93*a*, 93*b*. The upper chain guide roller 91 is rotatably mounted at an upper spacing from the axle 41. The lower chain guide roller 92 is rotatably disposed at a lower spacing from the P-axle 41, wherein the upper chain guide roller 91 is disposed at a smaller spacing from the P-axle 41 than the lower chain guide roller 92. The movable element 40 comprises a blocking device 100 (flip chip) which permits the pre-tensioned chain guide assembly 90 to be established in relation to the movable element 40. The derailleur 10 can thus be assembled and adjusted without the chain guide assembly 90 jumping rearwards by virtue of the pre-tensioning.

The derailleur 10 comprises a two-part base element 20, a movable element 40, a chain guide assembly 90, and a pivot mechanism 30 which connects the base element 20 to the movable element 40. The electromechanical drive for driving the pivot mechanism 30 is received in the gearbox housing 50 and is held by the base element 20. The power source 70 is attached to the rear of the base element 20.

Figure 3:
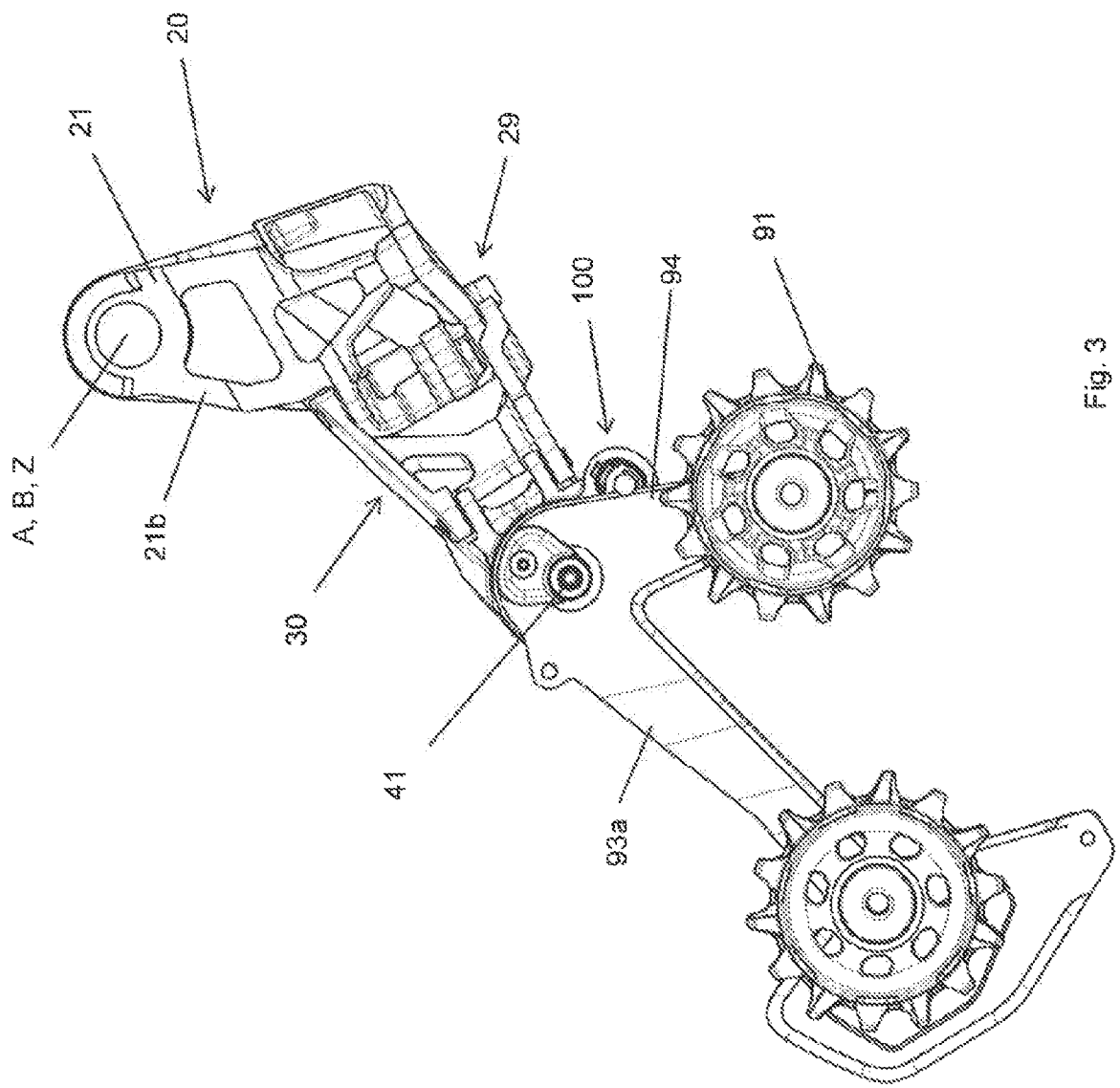
FIG. 3 shows an internal view of the derailleur in the first blocking setting and the first position.
Figure 4:
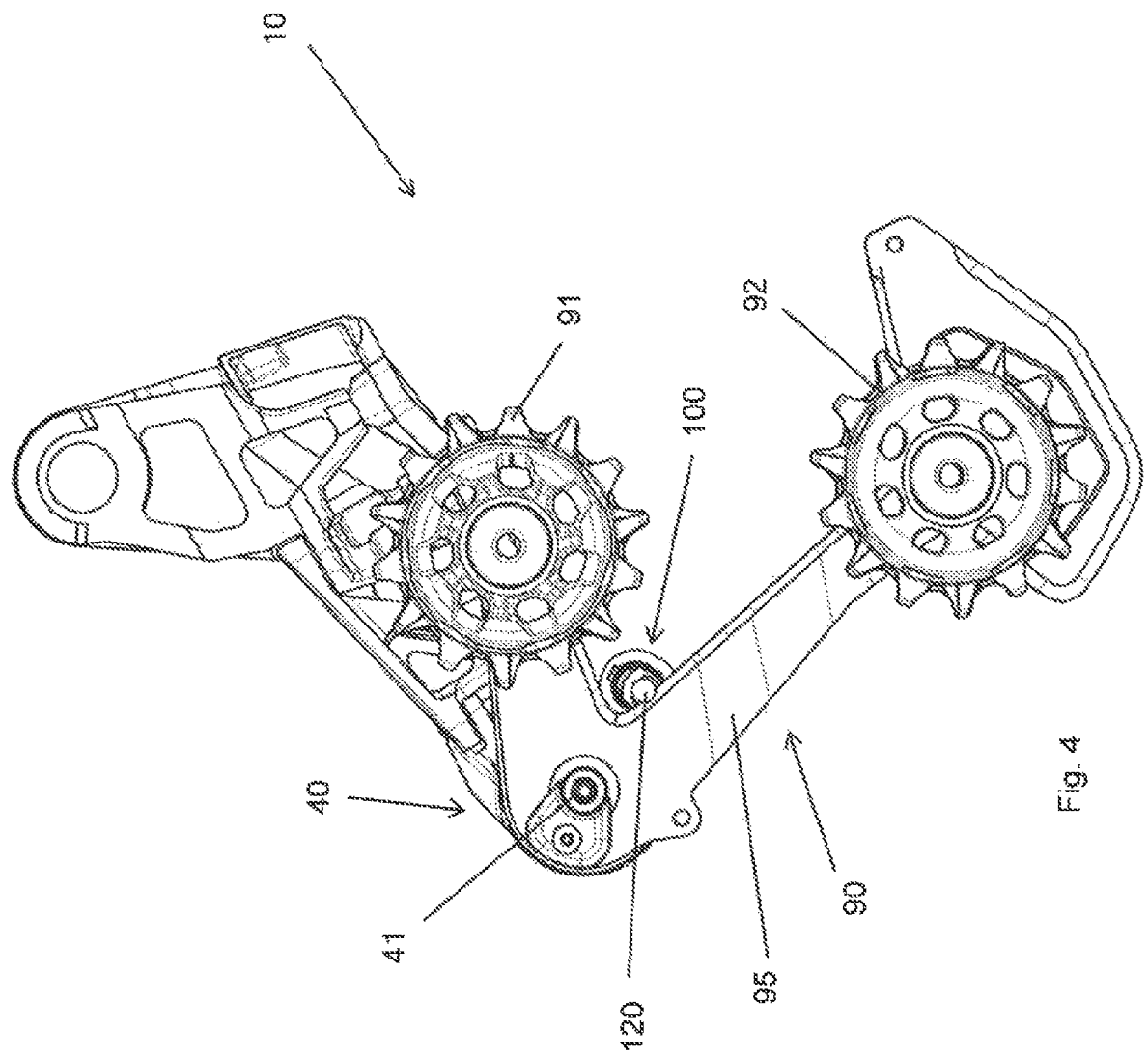
FIG. 4 shows an internal view of the derailleur in the second blocking setting and the first position.
Figure 5:
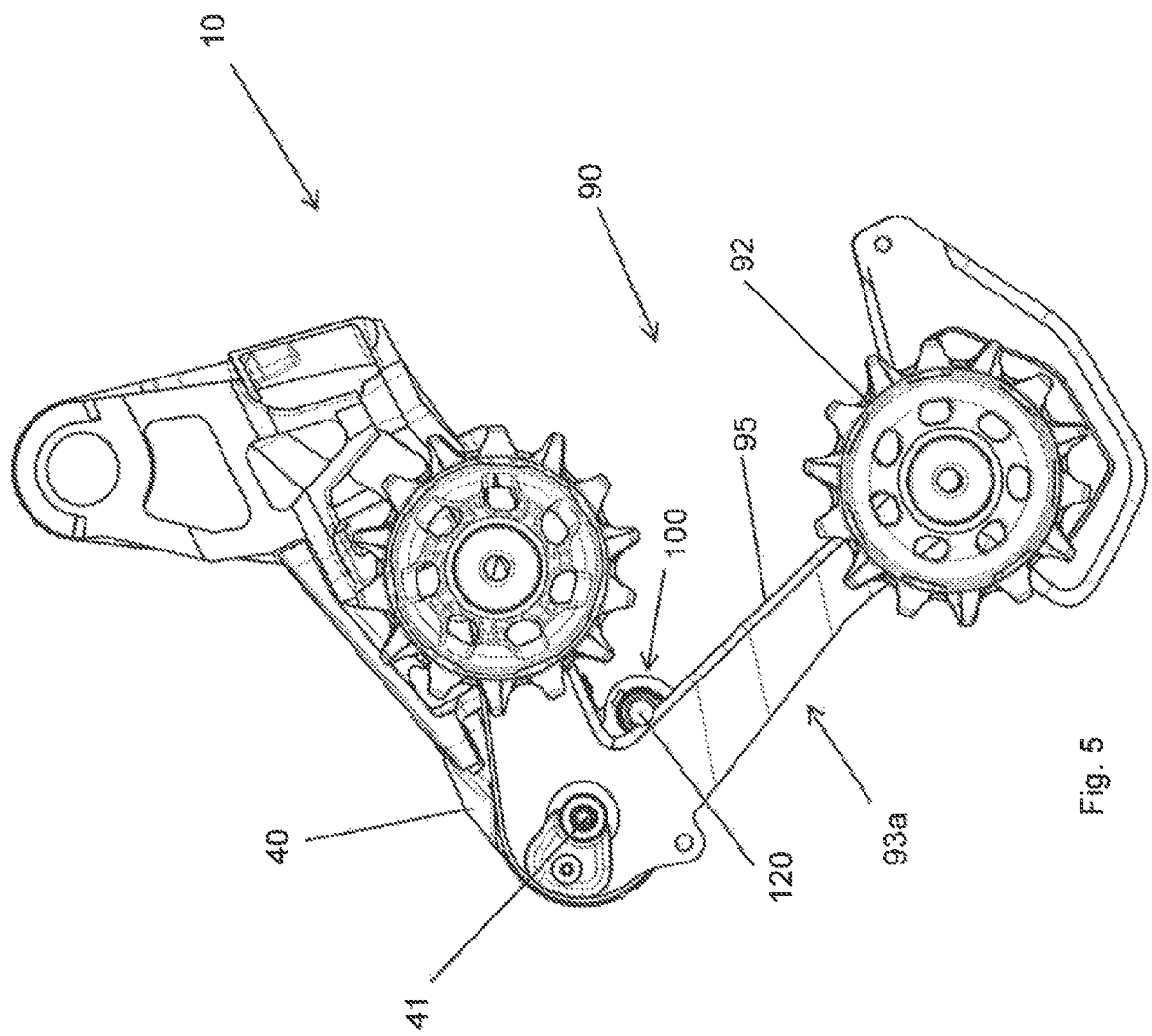
FIG. 5 shows an internal view of the derailleur in the second blocking setting and the second position.

FIGS. 3 to 5 show internal views of the electromechanical derailleur 10 in various blocking settings. The inner cage plate 93*b*, inter alia, is not illustrated for improved clarity.

The base element 20 on the first connection end 21 thereof has two arms 22*a*, 22*b* which for assembling on the rear wheel axle A are penetrated along the B-axis, or Z-axis, respectively, by a pin. In the state assembled on the frame, the B-axis of the pin 60 and the Z-axis of the centering openings of the base element 20 run so as to be coaxial with the frame opening and thus coaxial with the rear wheel axle A. The congruence of the three axes A, B and Z in the assembled state is derived from FIGS. 1 to 3. The coaxial assembling of the electromechanical derailleur 10 on the rear wheel axle A is understood to be the congruence of the B-axis of the derailleur 10 and the rear wheel axle A. In the case of derailleurs that are not, coaxially assembled, the B-axis of the derailleur is spaced apart from the rear wheel axle A.

The base element 20 on the second connection end 29 thereof has two axle receptacles for the pivot axles for rotatably mounting the pivot arms of the pivot mechanism 30. The longitudinal axes of the axle receptacles run so as to be substantially parallel to the sprocket planes, or orthogonally intersect the rear wheel axle A. Independently of whether the base element 20 is configured in one part of a multiple parts, the position of the centering openings in the arms 22*a*, 22*b* on the first connection end 21 and the position of the axle receptacles on second connection end 29 are mutually invariable. The centering openings of the first connection end 29 are able to be assembled so as to be coaxial with the rear wheel axle A, and the second connection end 29 serves for coupling to the pivot mechanism 30. This means that the Z-axis of the centering opening and the longitudinal axes of the axle receptacles for the pivot axles are invariable in terms of their mutual position. In other words, said Z-axis and said longitudinal axes are configured so as to be mutually rigid. As opposed to the prior art, there is no articulated connection between a derailleur hanger, which is configured for assembling on the rear wheel axle A, and the base element (B-knuckle), the latter comprises the axle receptacles for the pivot mechanism.

FIG. 3 shows the derailleur in the first blocking setting (cage lock) in which the chain guide assembly 90 for removing the rear wheel is established relative to the movable element 40. To this end, the blocking element 120 of the blocking device 100 engages on an edge of the upper cage arm 94 of the outer cage plate 93*a*, between the upper chain guide roller 91 and the pivot axle 41.

Depending on the category of bicycle present, the blocking device 100 can be latched in the first position or in the second position in the movable element 40, said second position being rotated by 180 degrees. FIG. 3 shows the blocking device 100 in the first position (corresponds to bicycle category 1).

FIG. 4 shows the derailleur in the second blocking position (chain gap adjust) in which the chain guide assembly 90 for adjusting the rear derailleur 10 relative to the multi-sprocket assembly 4 is established relative to the movable element 40. To this end, the blocking element 120 of the blocking device 100 engages on an edge of the lower cage arm 95 of the outer cage plate 93*a*, between the lower chain guide roller 92 and the pivot axle 41 (P-axle). Depending on the bicycle category present, the blocking device 100 can be inserted into the movable element 40 in the first position or in the second position, the latter being rotated by 180° in relation to the first position. FIG. 4 shows the blocking device 100 in the first position (corresponds to bicycle category 1).

FIG. 5 corresponds largely to the illustration in FIG. 4 and likewise shows the derailleur in the second blocking position. However, the blocking device 100 in this embodiment is inserted into the movable element 40 in the second position (corresponds to bicycle category 2). This means that the blocking device 100 is disposed so as to be rotated by 180 degrees in comparison to FIG. 4. By virtue of the eccentric construction of the blocking device 100, the contact face 126 of the blocking element 120 for interacting with the lower cage arm 95 of the outer cage plate 93*a* is repositioned as a result of the rotation by 180 degrees. Accordingly, the cage contacts the blocking element 120 later so that the chain guide assembly 90, by virtue of the pre-tensioning of the damper, is a rotated further towards the rear about the P-axle 41.

The chain guide assembly 90 in the second position of the blocking device 100 is blocked relative to the movable element 40 in a different angular position than in the first position of the blocking device 100. This becomes evident when comparing FIGS. 4 and 5.

Figure 6:
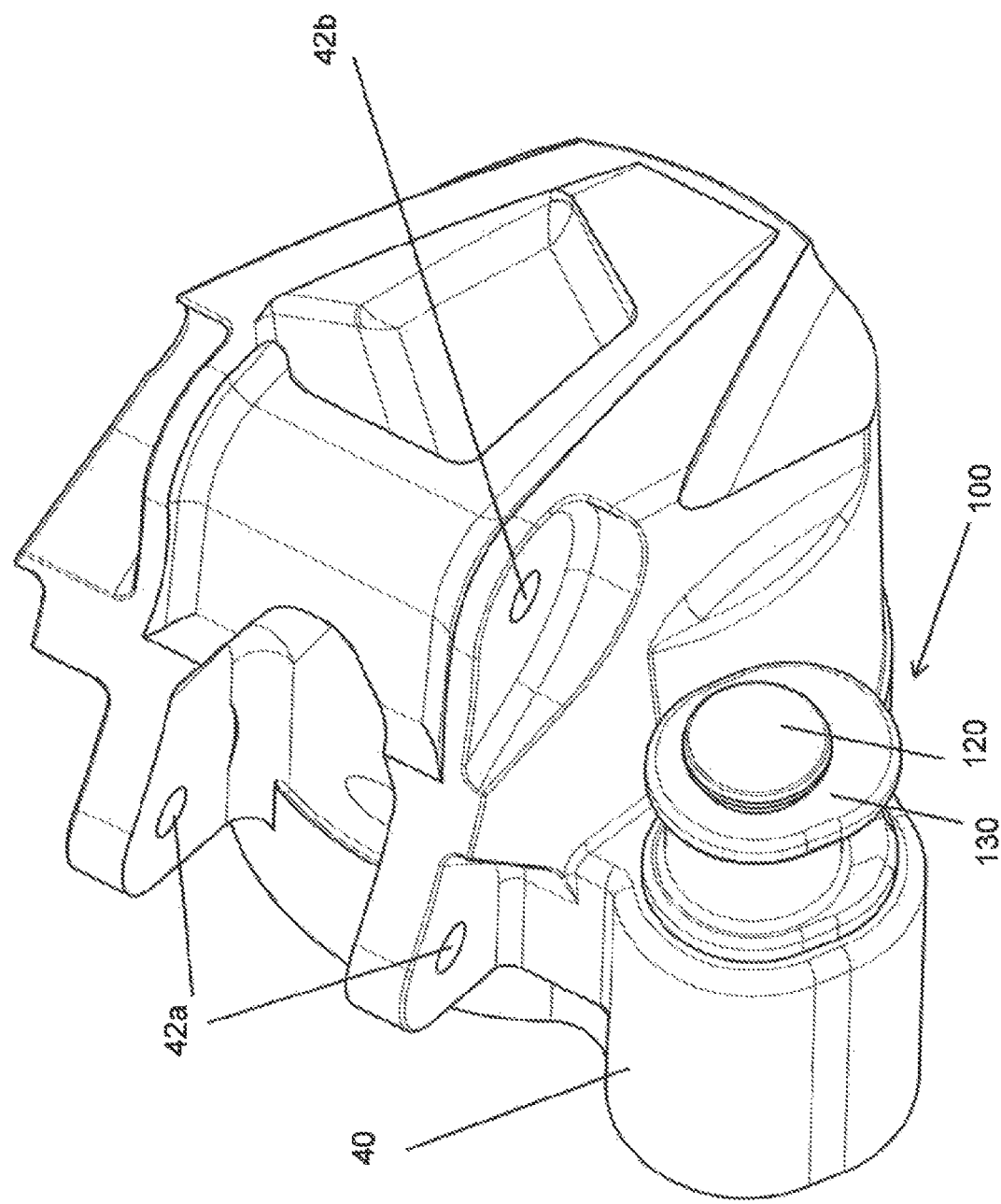
FIG. 6 shows a perspective view of the movable element having the blocking device.

FIG. 6 shows a perspective external view of the movable element 40 having the blocking device 100 attached thereto. The movable element 40 to this end has an opening in which the blocking device 100 is received and established, said blocking device 100 being composed of the thrust pin 120 and the pin housing 130. The blocking device 100 is shown in a blocking setting; the thrust pin 120 is pushed up to a detent in the pin housing 130. The movable element 40 furthermore has two axle receptacles 42*a*, 42*b* in which the pivot axles of the pivot mechanism 30 are able to be mounted (cf. one of the preceding FIGS.).

Figure 7:
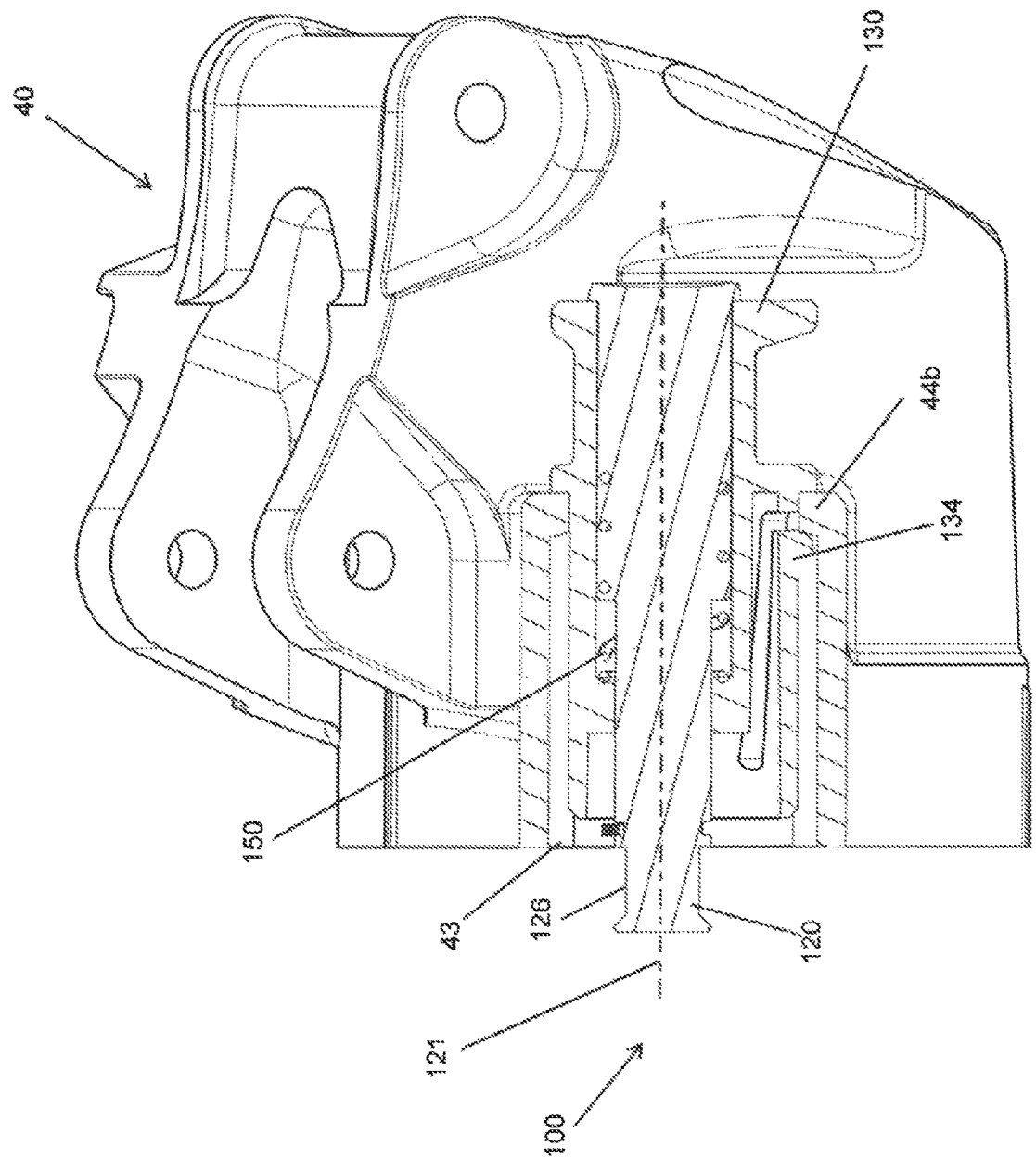
FIG. 7 shows a sectional view of the movable element having the blocking device in the second position—blocked (active setting)

FIG. 7 shows a sectional view through the movable element 40, more specifically through the receptacle 43 and the blocking device 100 disposed therein. The blocking device 100 is latched in the second position in the receptacle 43. The elastic latching cam 134 of the pin housing 130 in the second position bears on the second undercut 44*b* of the receptacle 43 of the movable element 40. The blocking device 100 is situated in a blocking setting (active setting). This means that the thrust pin 120 is displaced along the longitudinal axis 121 in the pin housing 130. To this end, the spring force of the spring 150 has to be overcome, for example by manual force.

The pre-tensioned chain guide assembly, not illustrated here, pushes against the contact face 126 on the thrust pin 120 and holds the latter in the active setting until the chain guide assembly is rotated manually towards the front, counter to the pre-tensioning of the damper. The thrust pin 130 is then released and, by virtue of the spring pre-tensioning 150, springs back to the initial setting, or passive setting, respectively, of said thrust pin 130.

FIG. 8 again shows the blocking device 100 from FIG. 7 in the second position, with the latching cam 134 engaging with the second undercut 44*b*. The blocking device 100 in this illustration is not situated in a blocking setting but in a passive setting. The thrust pin 120 by virtue of the spring force of the spring 150 is positioned in the initial setting of said thrust pin 120. The movement of the thrust pin 120 in the axial direction is delimited by the locking ring 140. The locking ring 140 interacts with the undercut 125 on the thrust pin 120, on the one hand, and with the detent 135 on the pin housing 130, on the other hand. The locking ring prevents the thrust pin 130 slipping axially outward out of the housing 130.

Figure 8:
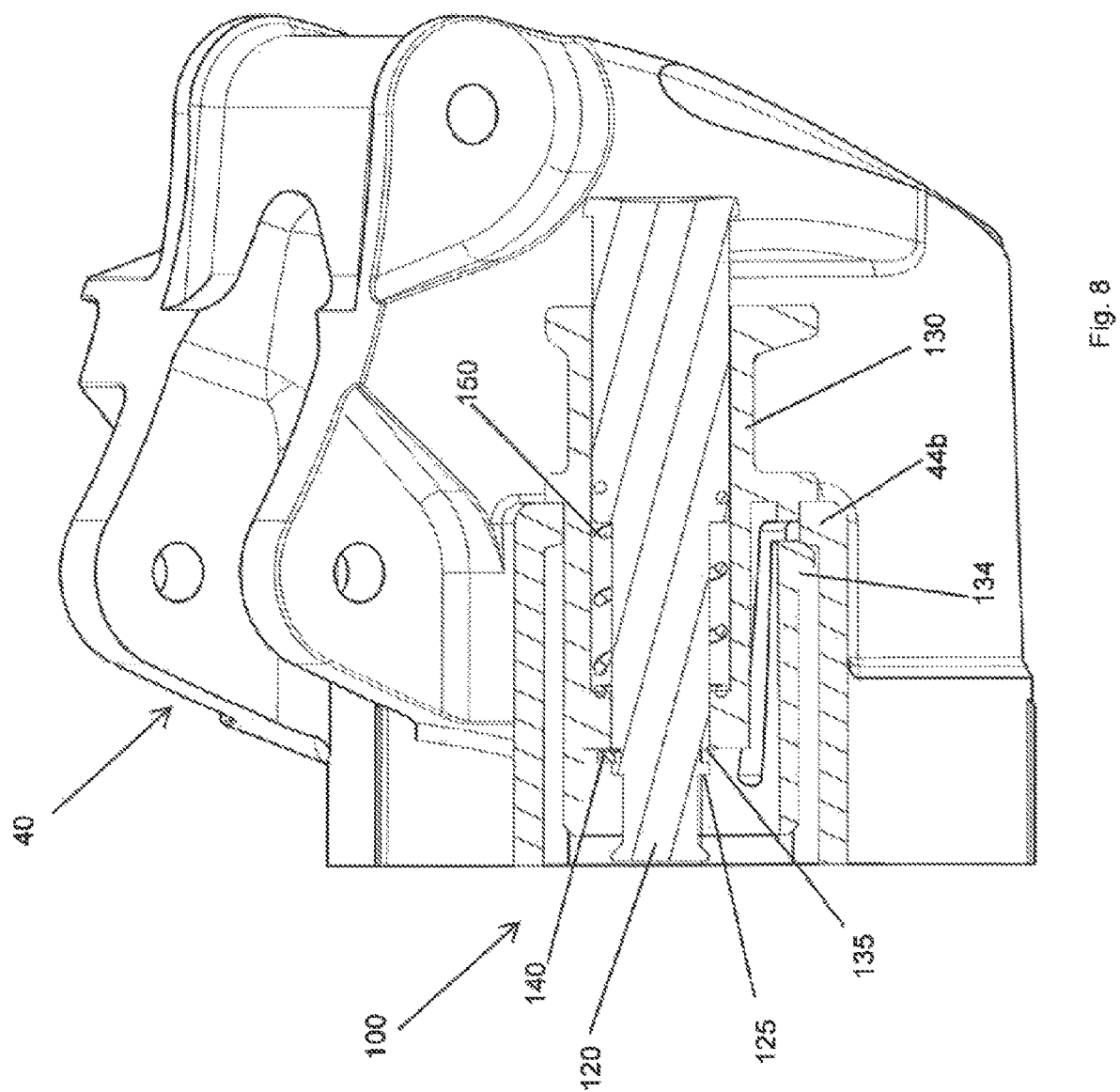
FIG. 8 shows a sectional view of the movable element having the blocking device in the second setting—not blocked (passive setting)
Figure 9:
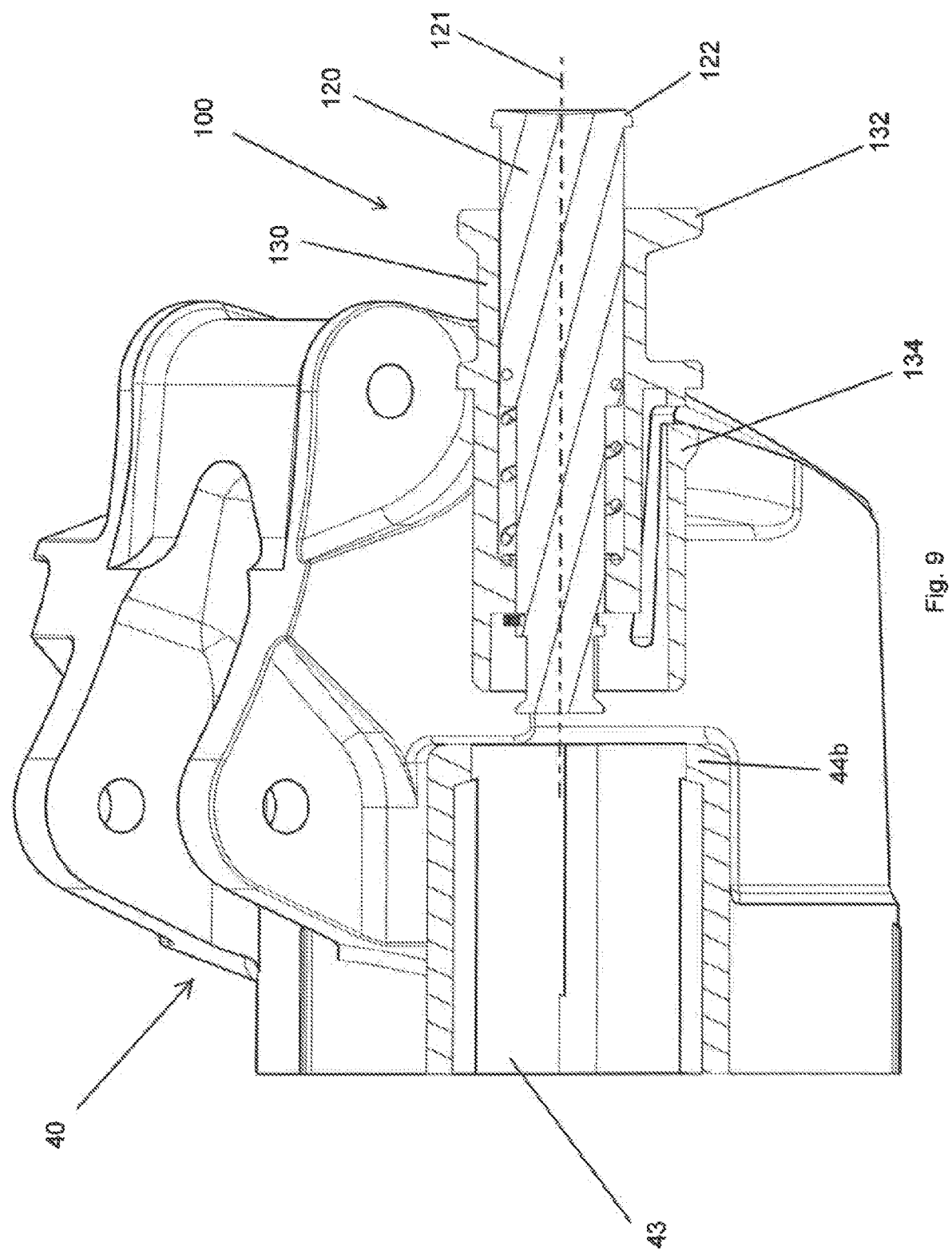
FIG. 9 shows a sectional view of the blocking device in the second position, retrieved from the movable element.

FIG. 9 shows the blocking device 100 from FIGS. 7 and 8, while said blocking device 100 in the second position is being retrieved from the movable element 40. To this end, the elastic latching action between the latching cam 134 and the second undercut 44*b* has to be overcome by a tensile force. Therefore, the latching cam 134 as well as the undercut 44*b* are configured with a chamfer. The blocking device 100 can be gripped on the protrusion 132 of the pin housing 130 and be extracted from the receptacle 43 in the direction of the longitudinal axis 121.

The protrusion 132 simultaneously serves as an external detent for the thrust pin 130. The compression end 122 of the thrust pin 120, the former being enlarged in terms of the diameter, in the active setting of the end side of the protrusion 132 impacts the housing 130.

Figure 10:
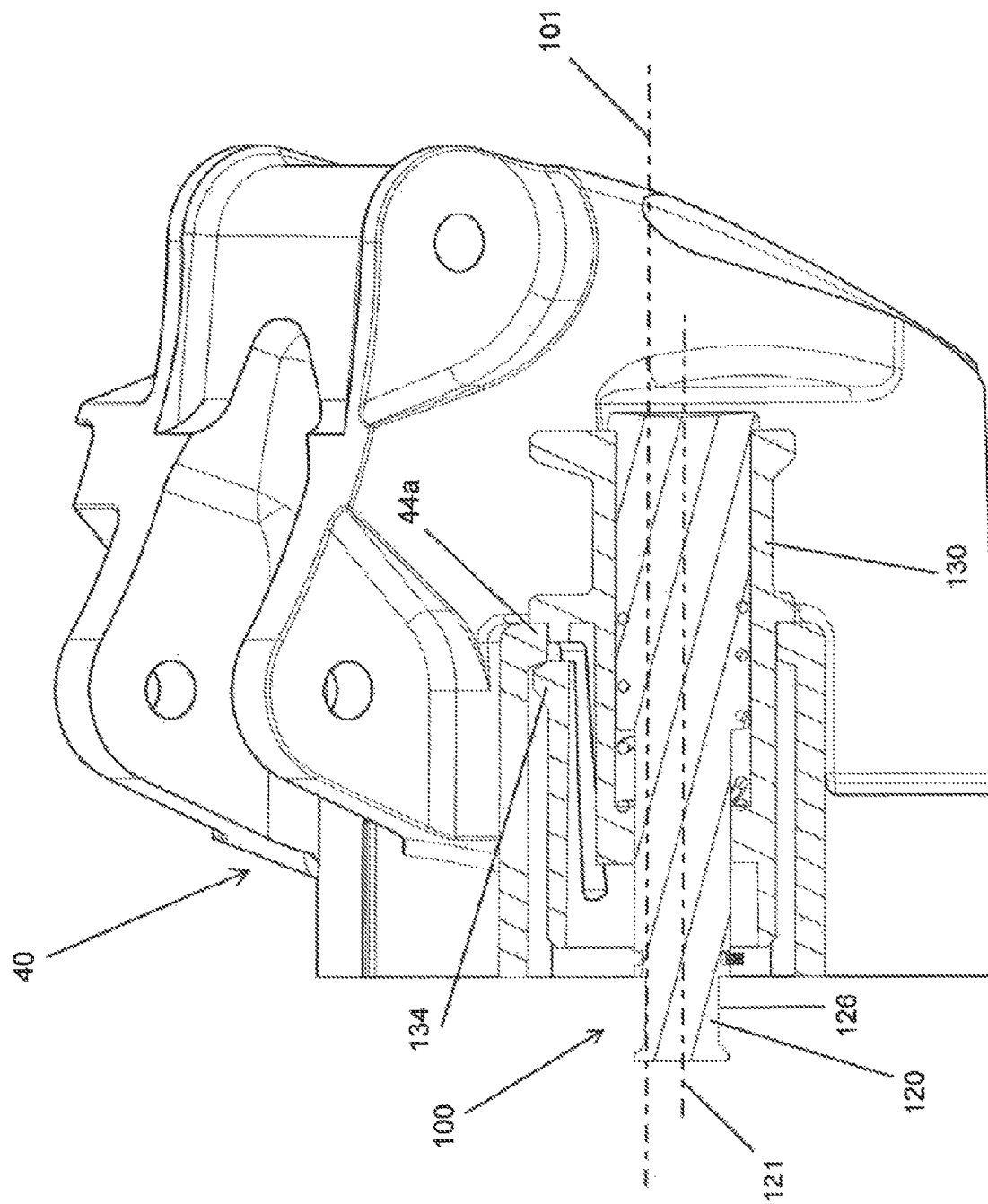
FIG. 10 shows a sectional view of the movable element having the blocking device in the first setting—blocked (active setting)

FIG. 10 shows a sectional view through the movable element 40, more specifically through the receptacle 43 and the blocking device 100 disposed therein. The blocking device 100 this time is latched in the first position in the receptacle 43. In the first position, the elastic latching cam 134 of the pin housing 130 bears on the second undercut 44*b* of the receptacle 43 of the movable element 40. The blocking device 100 in the first position is thus rotated by 180 degrees in relation to the second position illustrated in FIGS. 7 to 9. The rotation by 180 degrees takes place about the longitudinal axis 101 of the blocking device 100. The longitudinal axis of the blocking device 100 runs so as to be parallel to the longitudinal axis 121 of the thrust pin 120 but so as to be offset thereto. The thrust pin 120 is thus eccentrically disposed in the housing 130. The blocking device 100 is illustrated in a blocking setting (active setting).

When comparing the blocking device 100 in FIG. 7 (second position), said blocking device 100 being rotated by 180 degrees, and in FIG. 10 (first position), it can be seen that the longitudinal axes 121 come to lie at a mutual spacing X. This dissimilar positioning of the longitudinal axis 121 of the thrust pin 120 the to the contact face 126 being repositioned.

Accordingly, the chain guide assembly is blocked at a different angular position.

Figure 11:
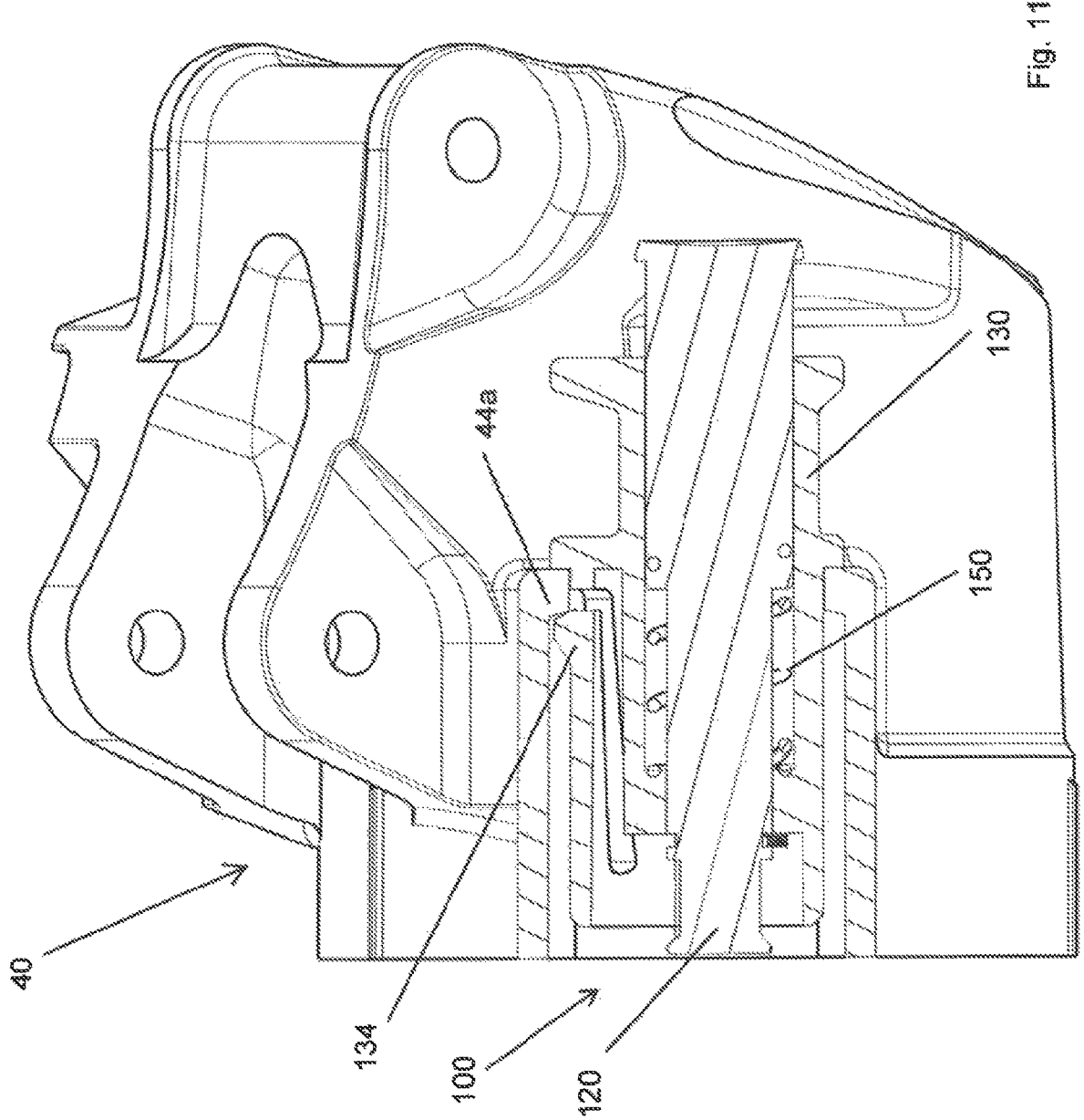
FIG. 11 shows a sectional view of the movable element having the blocking device in the first position—not blocked (passive setting)
Figure 12:
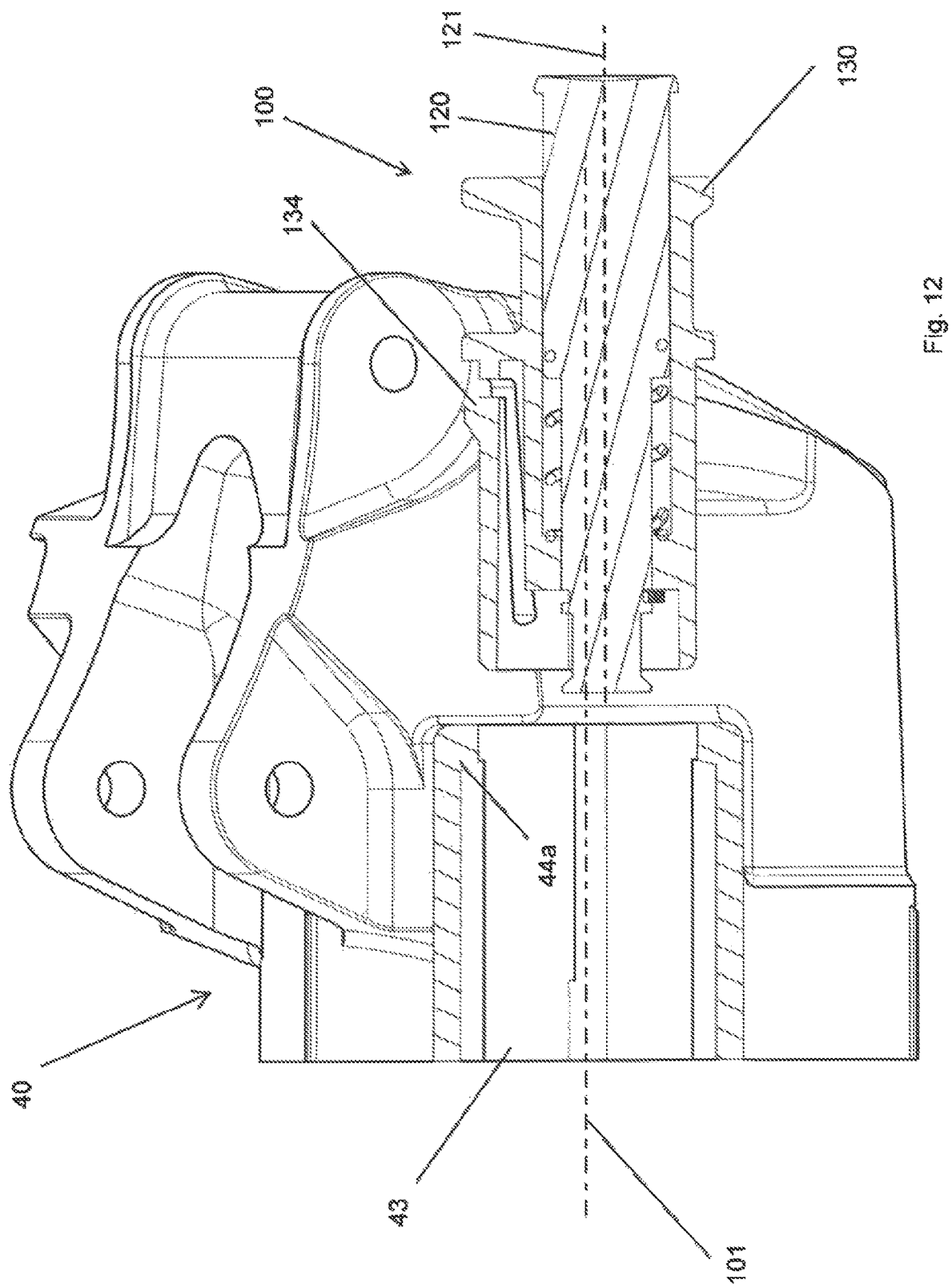
FIG. 12 shows a sectional view of the blocking device in the first position, retrieved from the movable element.

FIGS. 11 and 12 correspond largely to the illustrations in FIGS. 8 and 9, with the difference that the blocking device is inserted into the movable element 40 in the first position, thus so as to be rotated by 180 degrees about the longitudinal axis of the blocking device 100. Accordingly, the latching cam 134 has been brought to engage with the first undercut 44*a*.

FIG. 11 shows the blocking device 100 in a non-blocked setting (passive setting).

FIG. 12 again shows the blocking device 100 retrieved from the receptacle 43. In order to be retrieved, the chamfered elastic latching cam 134 has overcome the chamfered first undercut 44a and is extracted from the receptacle 43 along the longitudinal axis 101. The longitudinal axis 101 of the blocking device 100 also corresponds to the longitudinal axis of the receptacle 43 in the movable element 40. The longitudinal axis 101 runs so as to be offset in parallel to the longitudinal axis 121 of the thrust pin 120.

Figure 13:
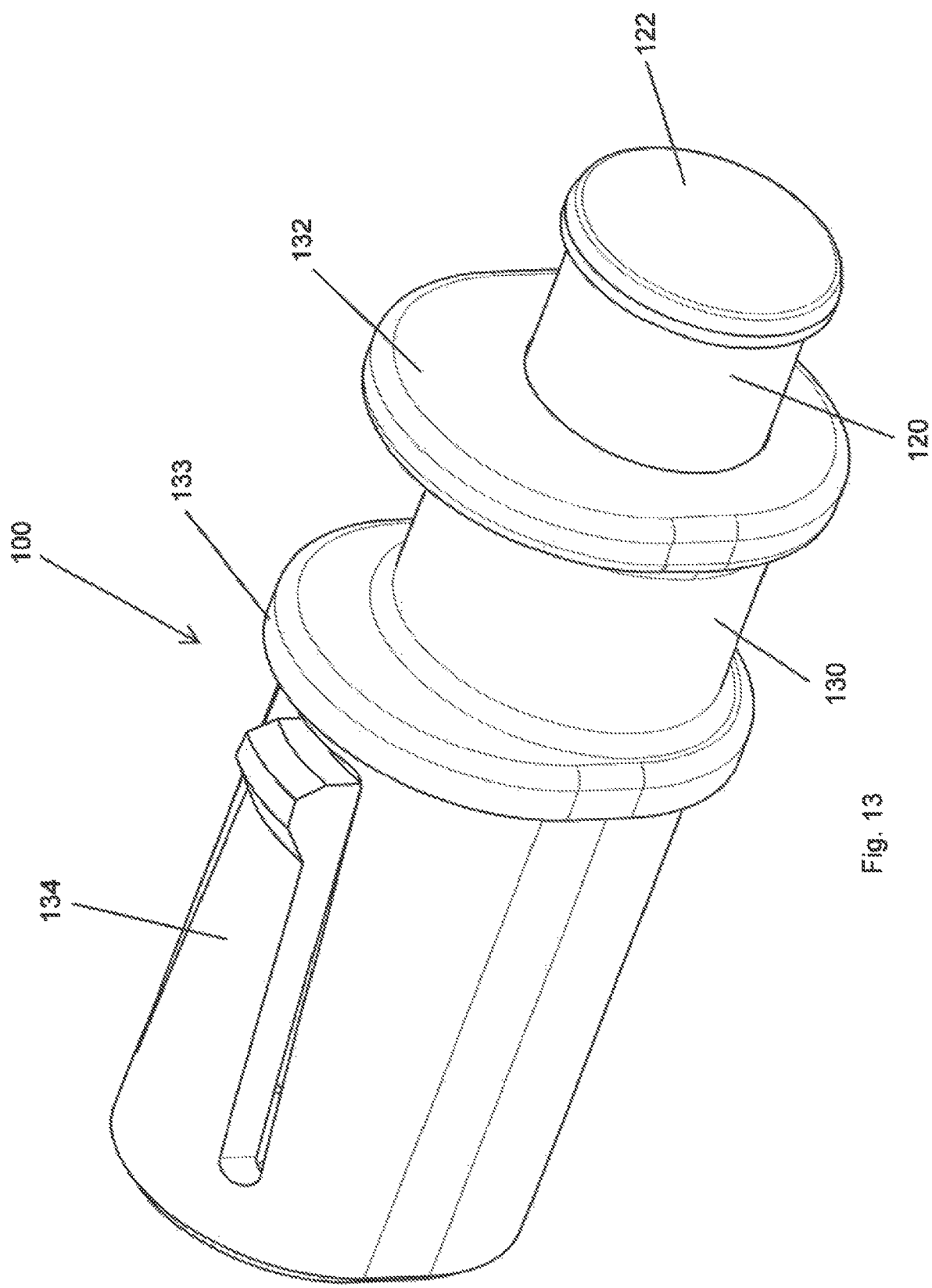
FIG. 13 shows a perspective view of the blocking device—not blocked (passive setting)

FIG. 13 shows a perspective view of the blocking device 100 in the non-blocked setting (passive setting). The blocking element 120 in an axially outward manner projects beyond the pin housing 130. The compression end 122 is spaced apart from the detent 132. The pin housing 130 possesses elliptical external diameters of dissimilar sizes. The elastic latching cam 134 is integrally molded with the pin housing 130. The large diameter 133 serves as a detent on the movable element 40, in particular on the axially outer end side of the receptacle 43 (cf. FIG. 11). The large diameter 132 serves as a detent for the compression end 122 and also as an engagement face for extracting the blocking device 100 from the movable element and for handling said blocking device 100.

Figure 14:
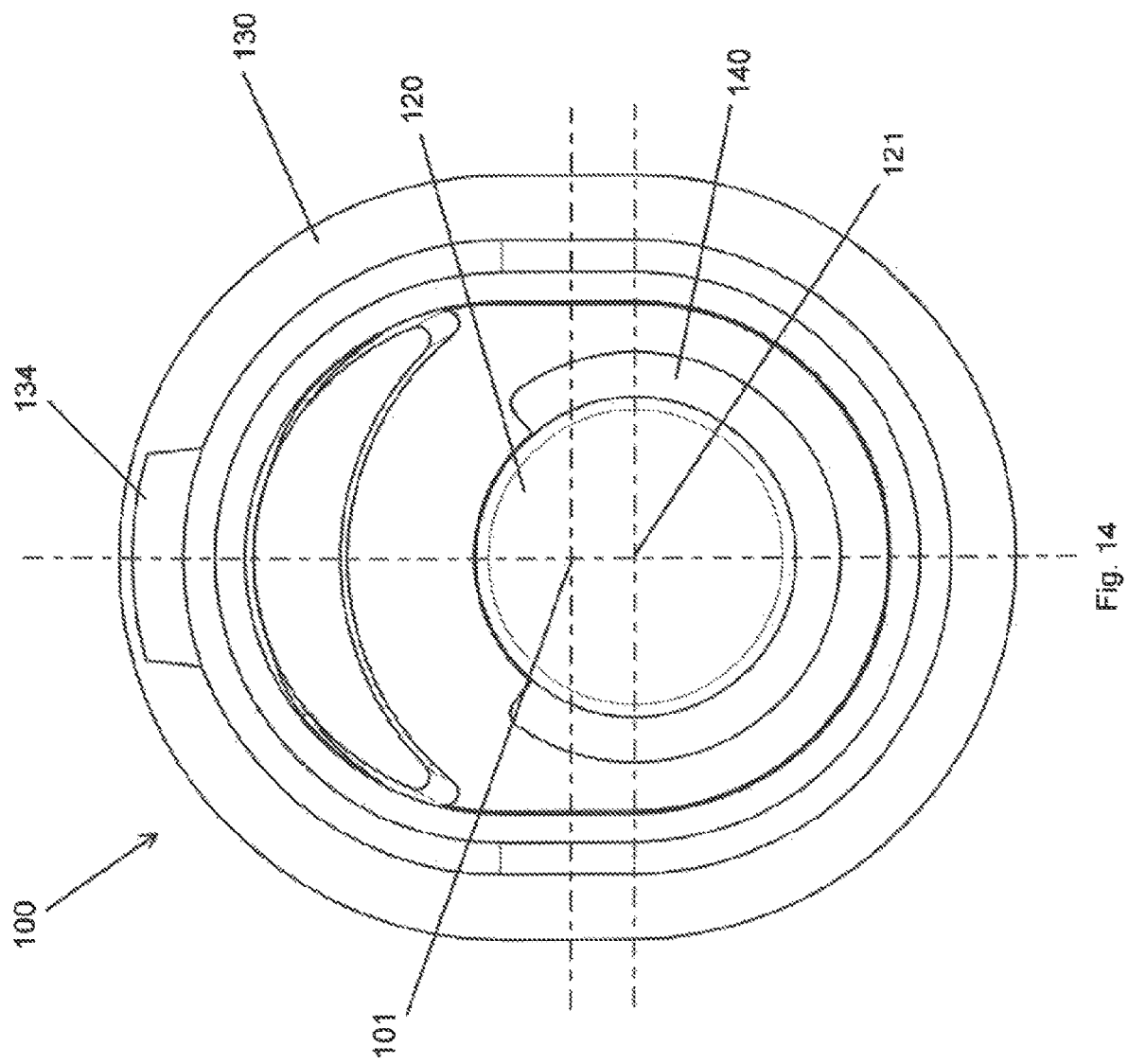
FIG. 14 shows an internal view of the blocking device according to the disclosure.

FIG. 14 shows an internal view of the blocking device 100. The eccentric alignment of the blocking element 120 becomes evident here. Both transverse axes for the blocking element 120 and the blocking device 100 are plotted. The transverse axes intersect in each case in the center, or along the longitudinal axis of the components, respectively. The center, or the longitudinal axis 121 of the blocking element 120, respectively, lies so as to be offset from the center or the longitudinal axis 101 of the blocking device 100, respectively. The locking ring 140 is configured so as not to be closed and can thus be clipped over the thrust pin 120.

Figure 15:
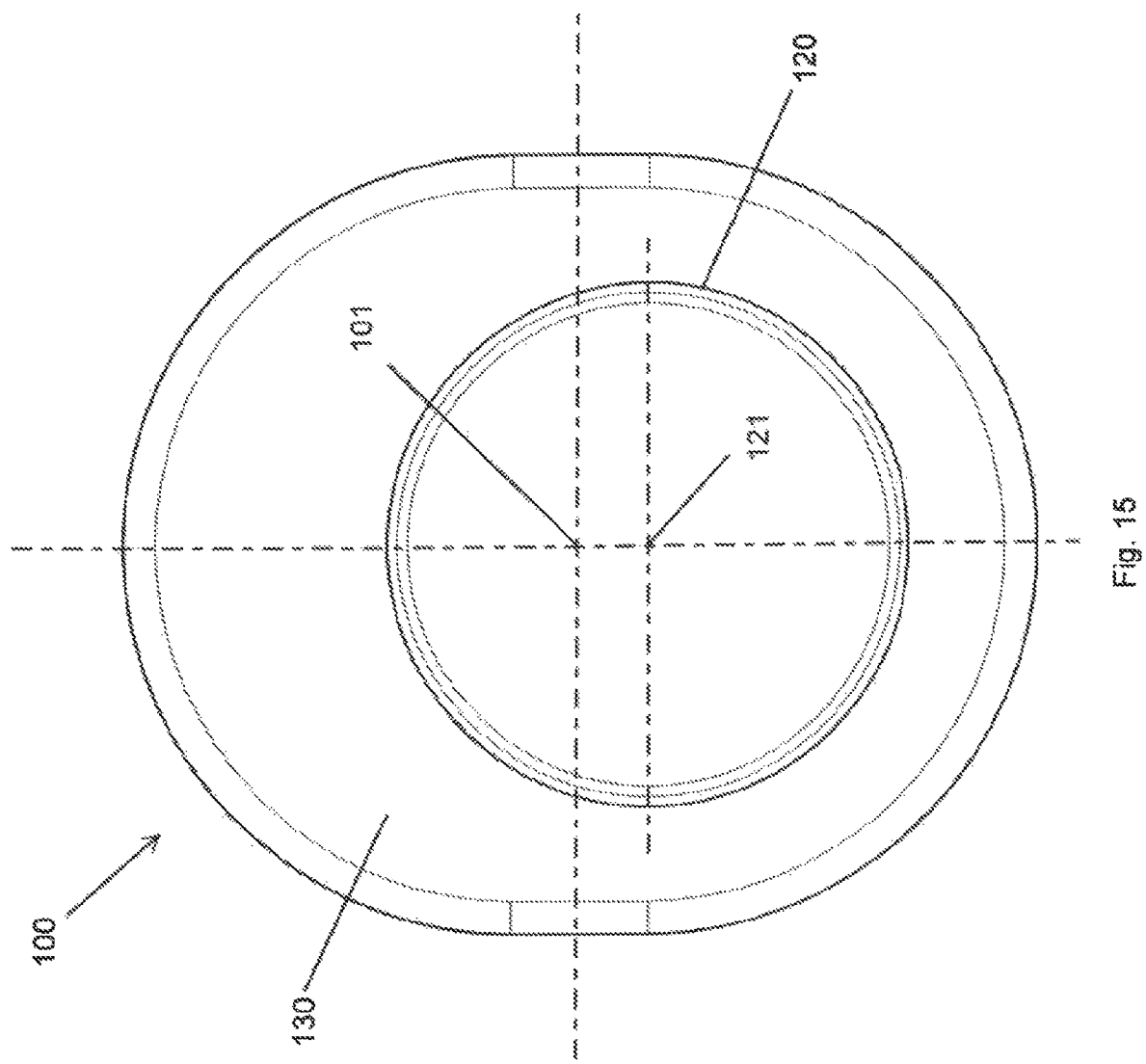
FIG. 15 shows an external view of the blocking device according to the disclosure.

FIG. 15 shows the corresponding external view of the blocking device 100, having the thrust pin 120 eccentrically mounted in the pin housing 130. The longitudinal axes 121 and 101 are mutually spaced apart.

Figure 16:
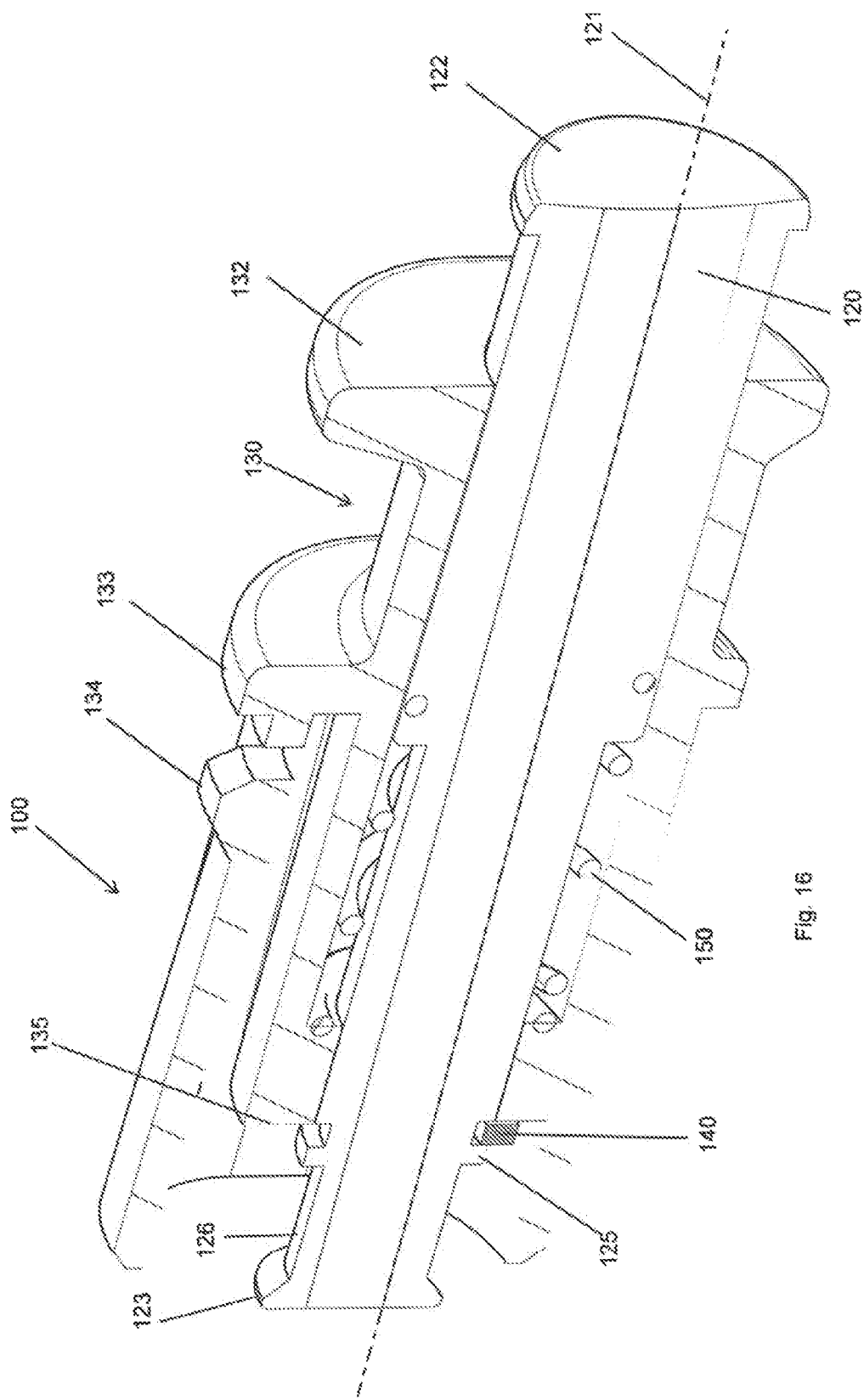
FIG. 16 shows a perspective sectional view through the blocking device—not blocked (passive setting)
Figure 17:
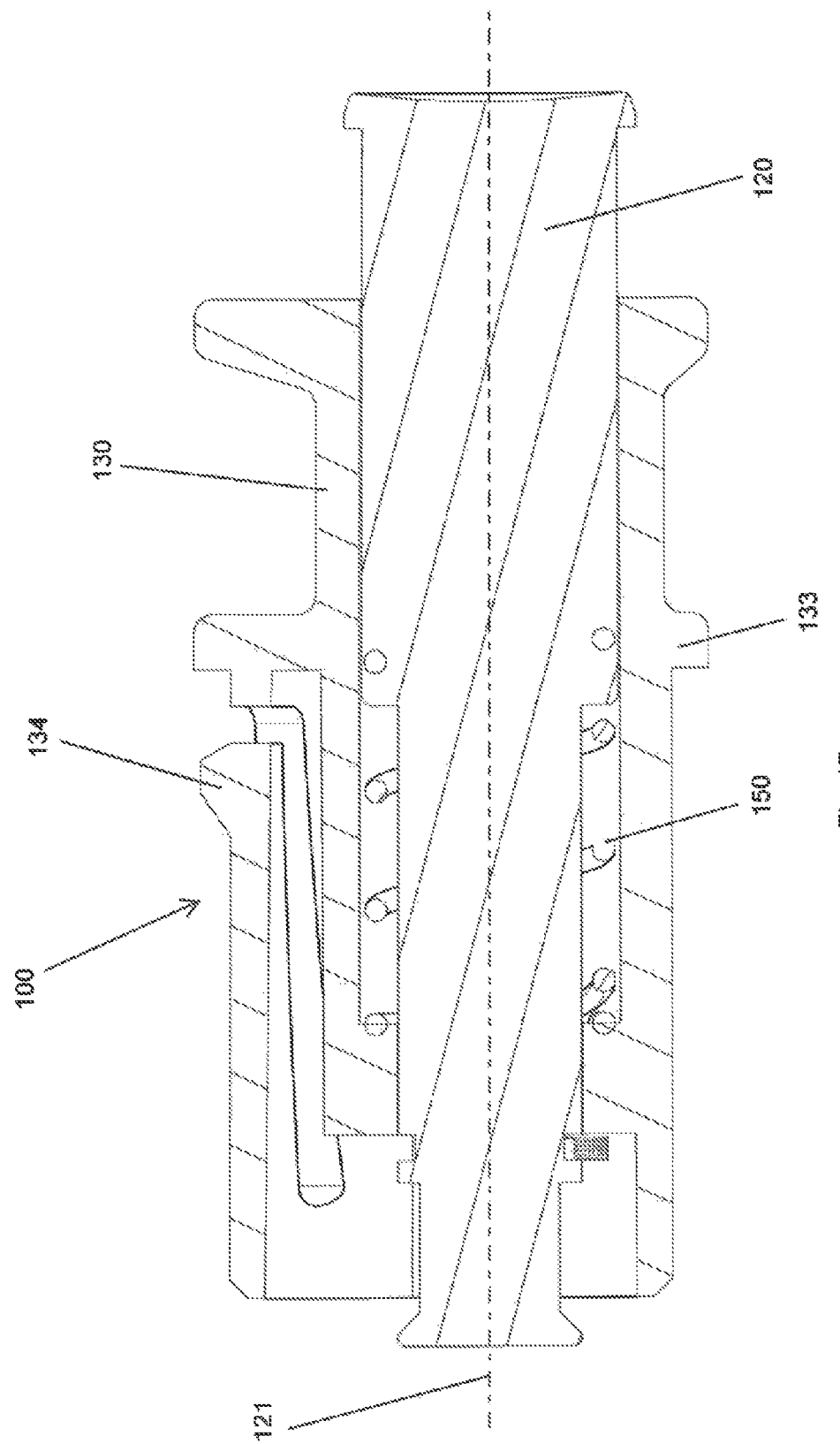
FIG. 17 shows a sectional view through the blocking device—not blocked (passive setting)

FIGS. 16 and 17 show a perspective sectional view and the lateral sectional view of the blocking device 100 in the passive setting. The spring 150 pre-tensions the thrust pin 120 in relation to the pin housing 130. The locking ring 140 delimits the pre-tensioning and is established between the protrusion 125 and the detent 135. The thrust pin 120 on the end thereof 122 has a compression face. The blockage end 123, enlarged terms of the diameter, in the blockage setting engages with the cage plate. In order for the thrust pin 120 not to be able to be retracted to the initial position, the diameter of the blockage end 123 is enlarged in relation to the contact face 126. A chamfer lies therebetween. The cage plate frictionally engages with the contact face 126 and the chamfer of the blockage end 123. The pin housing 130 has the latching cam 134 and a plurality of portions 132 and 133 which are enlarged in terms of the diameter.

A further aspect of the disclosure is thus simplified assembling and adjusting process of the rear derailleur 10 which is to be coaxially assembled.

Figure 18:
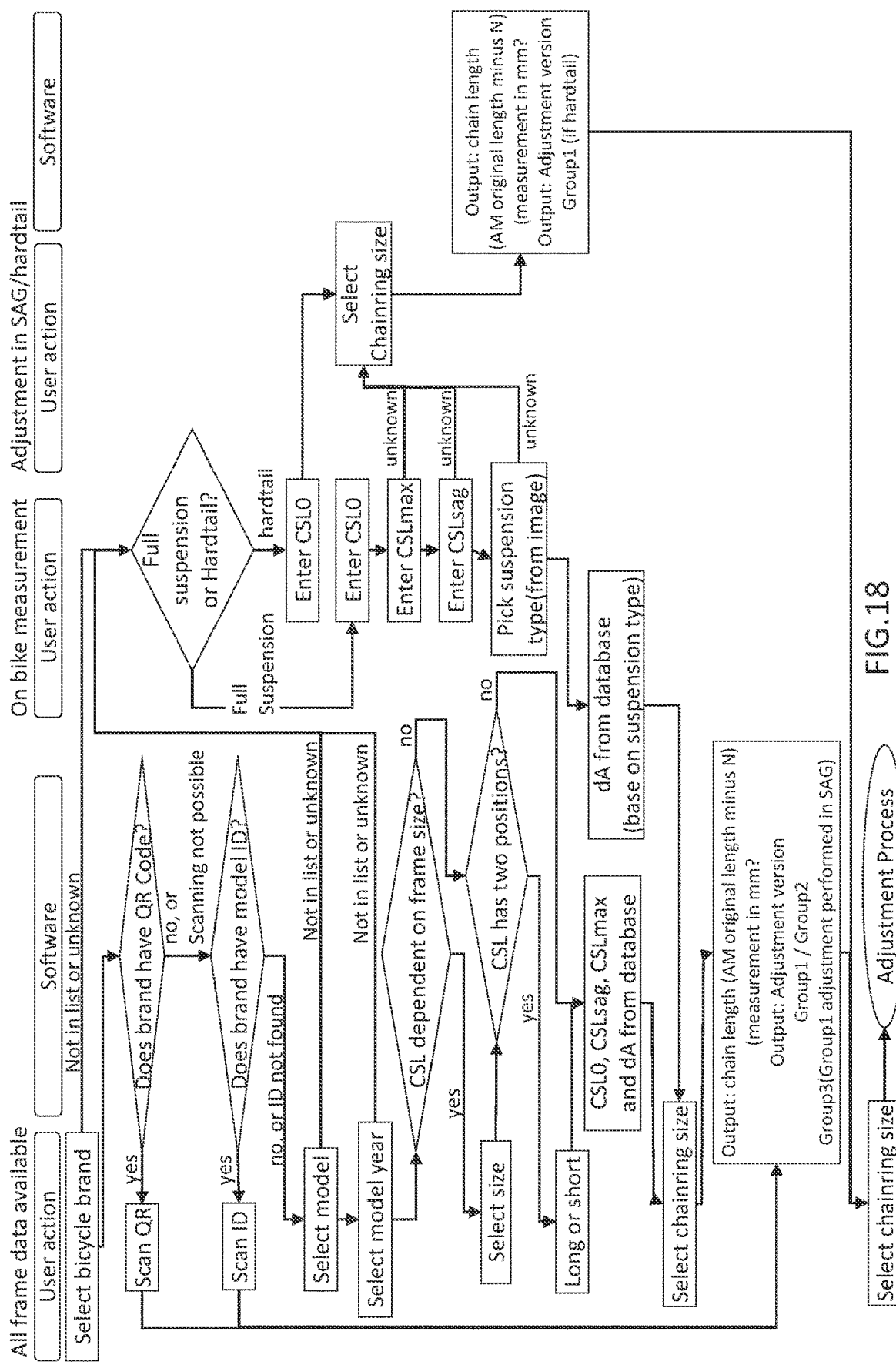
FIG. 18 shows a flow chart with an overall view—selection of the bicycle category.
Figure 18A:
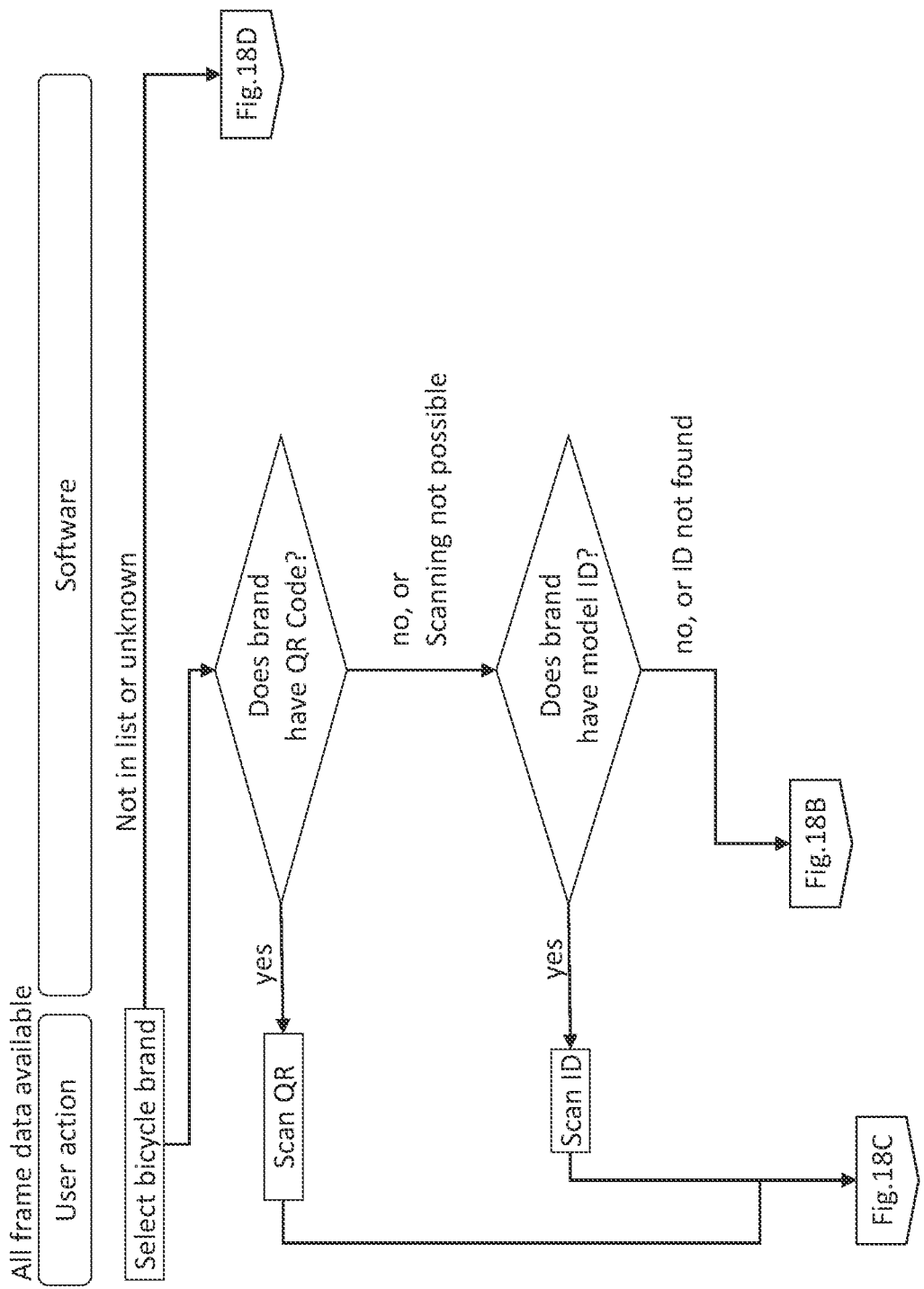
FIG. 18A shows a first enlarged portion of the flowchart from FIG. 18 (top left)
Figure 18C:
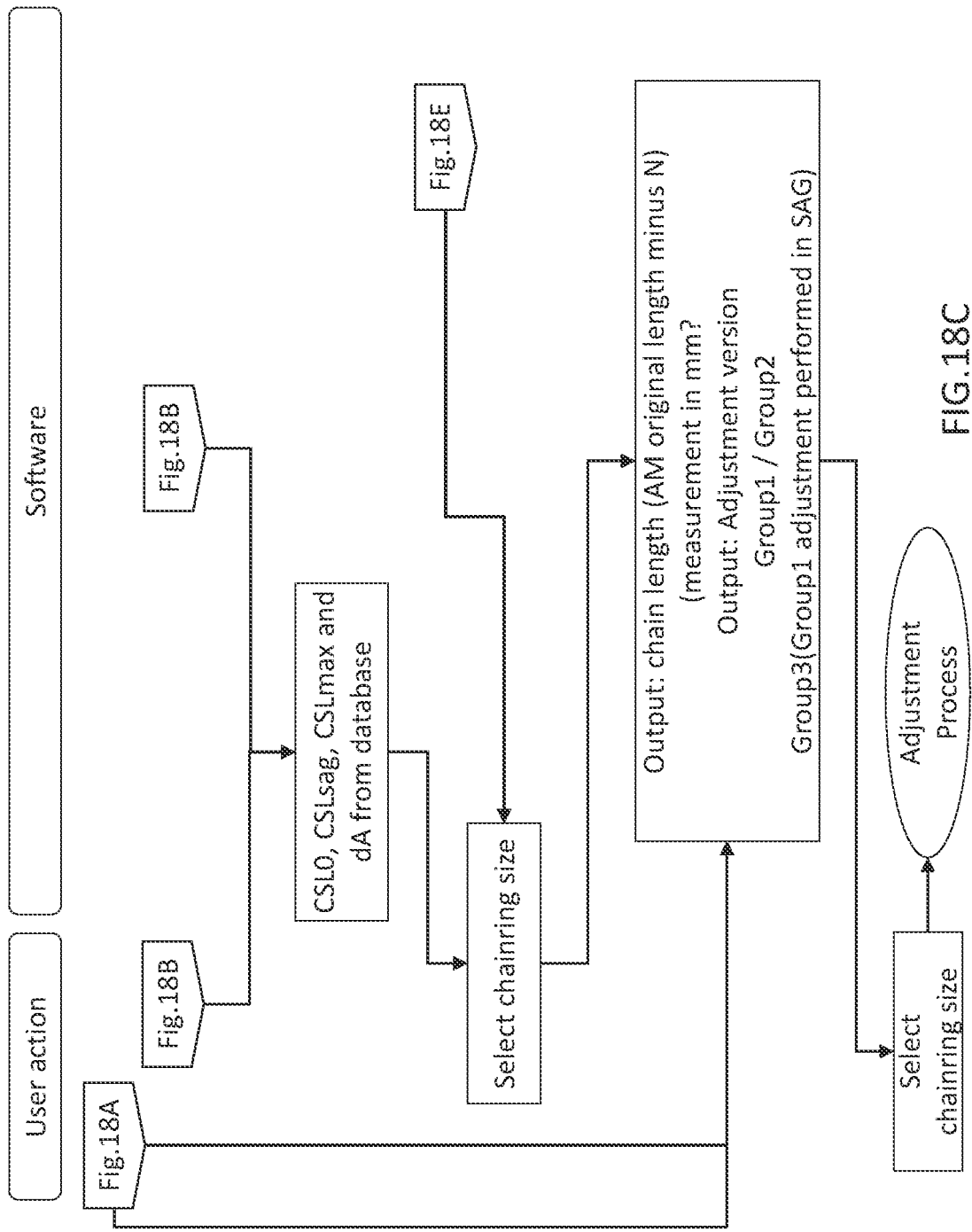
FIG. 18C shows a third enlarged portion from FIG. 18 (bottom left)
Figure 18D:
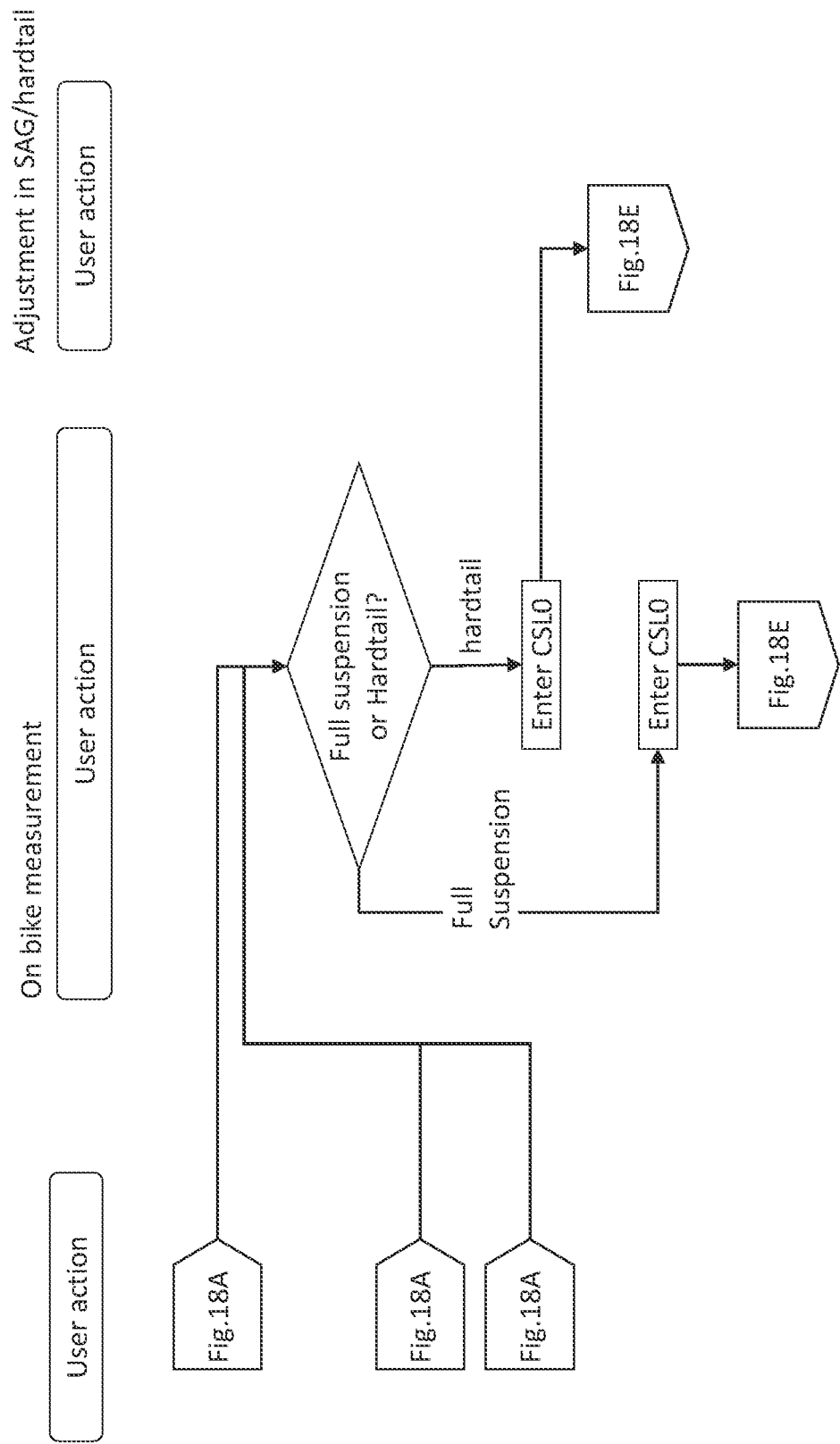
FIG. 18D shows a fourth enlarged portion from FIG. 18 (top right)
Figure 18E:
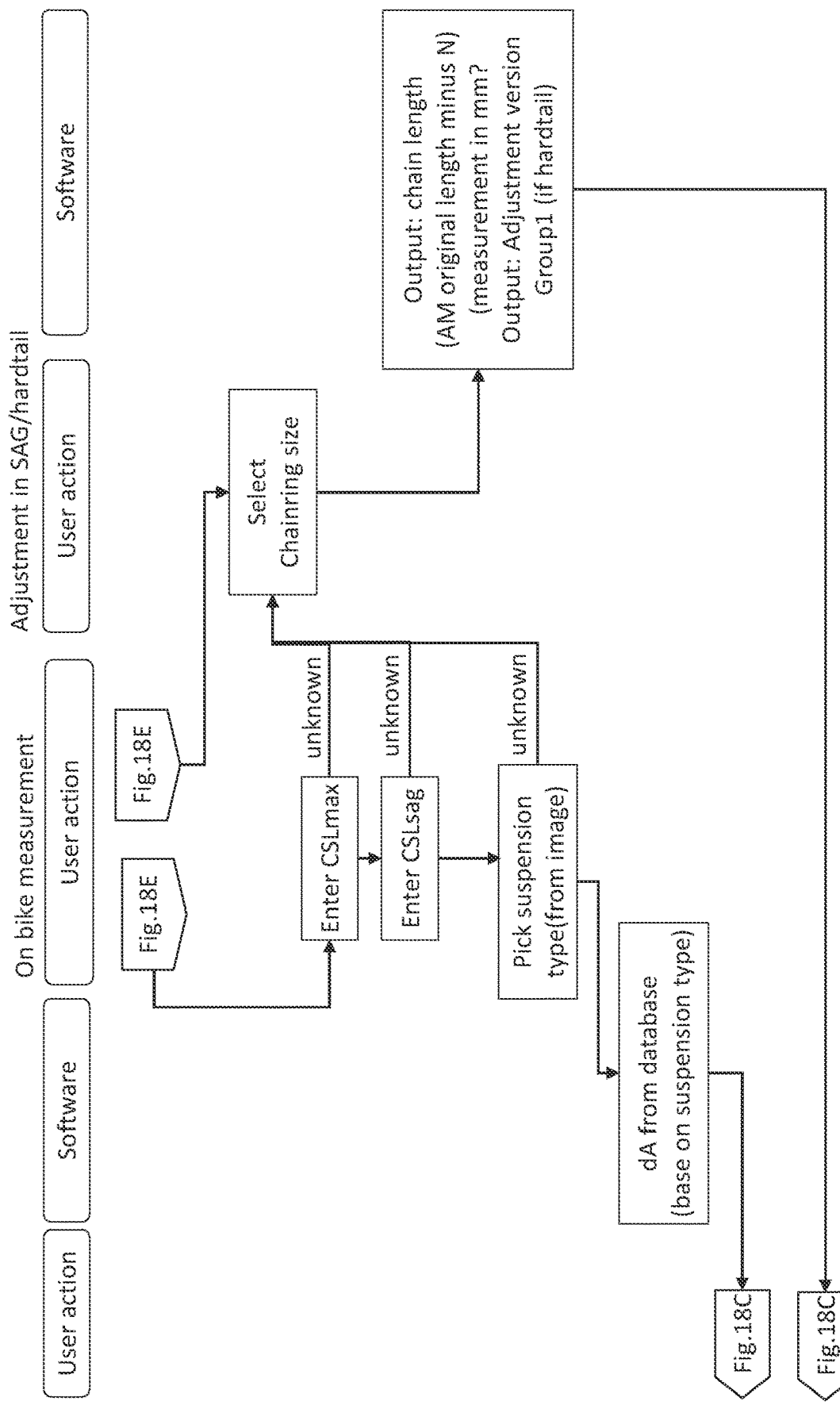
FIG. 18E shows a fifth enlarged portion from FIG. 18 (center right)
Figure 19:
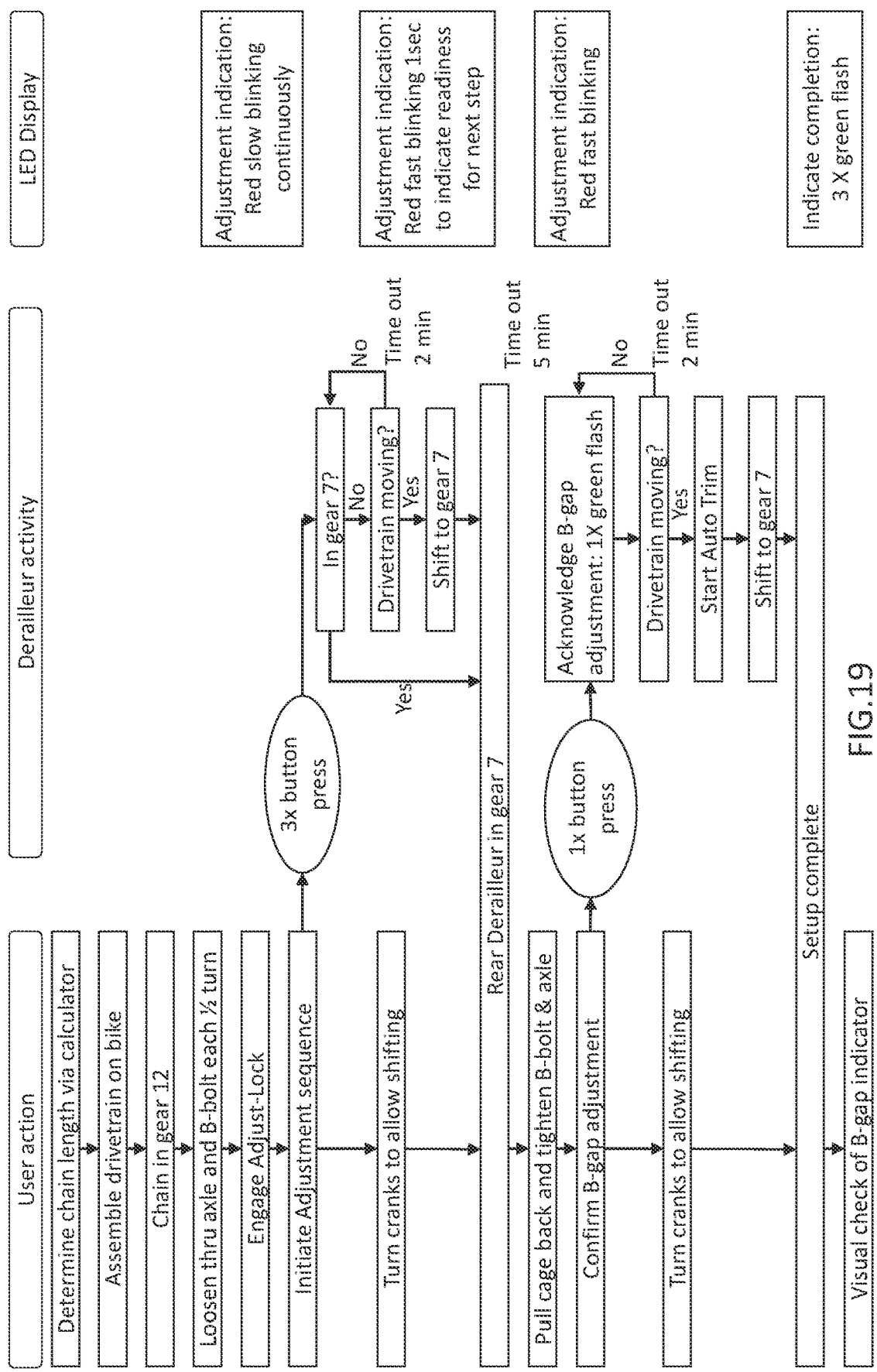
FIG. 19 shows a flow chart with an overall view—assembling and adjusting process of the derailleur.

Two flow charts in FIGS. 18 and 19 explain the individual steps of the processes. The steps are to some extent to be applied to mechanical as well as electromechanical derailleurs.

The blocking device 100 by which the chain guide assembly 90 pre-tensioned in the clockwise manner is established at a pre-determined rotary position in relation to the movable element 40 is also used during assembling and adjusting. The pre-determined rotary or angular position establishes the upper chain guide roller 91 at an ideal spacing (chain gap or B-gap) from a reference sprocket, for example on the seventh sprocket of the sprocket pack. In order for the derailleur 10 to be adjusted, the latter is locked by the blocking device 100. The locking action is released after the adjustment so that the chain guide assembly 90 can rotate relative to the movable element 40.

The assembling/adjusting steps of the derailleur 10 which generally apply mechanical and electric derailleurs are described hereunder. FIGS. 1 to 5 may be referred to.

(i) The derailleur 10 by the base element 20 and the adapter 60 is pre-assembled on the frame 1. To this end, the base element 20 encompasses the right dropout 2 of the frame 1, and the adapter 60 is inserted into the frame opening and the centering openings of the base element 20 and screw-fitted therein. The adapter 60 is screw-fitted to the extent that said adapter 60 conjointly with the base element 20 is held so as to still be rotatable on the frame 1. After the first assembling step, the adapter 60 and the base element 20 are pre-positioned in the axial and radial direction in relation to the frame 1 but not yet tightened. The adapter 60 and the base element 20 are rotatable about the axis A in relation to the frame 1.

(ii) The rear wheel conjointly with the entire hub assembly is inserted and a stud axle is screwed in but not yet fully tightened. The derailleur 10 in the not yet fully tightened state can still be rotated about the rear wheel axle A.

(iii) The adapter 60 is tightened. The pin here conjointly with the nut is rotated in the clockwise manner in relation to the base element 20 until the detents of the nut impact the counterpart detents of the base element 20. By virtue of the detents, the base element 20 and the entire derailleur 10 are entrained during further rotation until the chain 5 is tensioned. The base element 20 as well as the nut are established in the tensioned position such that the pin is screwed into the internal thread of the nut until the adapters 60 has been tightened on the frame 1.

The blocking device 100 can optionally be used. The locking mechanism 100 fixedly establishes the chain guide assembly 90, which is rotatable about the axis P 41, in a specific angular position and thus predefines the desired spacing between the upper chain roller 91 and the reference sprocket. To this end, the derailleur 10 is shifted to a reference gear, or onto a reference sprocket, respectively, the chain guide 90 is locked, and the base element 20 conjointly with the entire derailleur 10 is rotated about the rear wheel axle A towards the rear until the ideal chain tension is achieved.

(iv) The stud axle is tightened at the adjustment position, and the locking mechanism 100 is released. The inner arm 21b of the base element 20 is jammed between the hub end cap and the adapter 60 by tightening the stud axle. As a result thereof, the arm 22b conjointly with the entire base element 20 and the derailleur 10 is aligned so as to be orthogonal to the hub end cap, or to the rear wheel axle A, respectively. Potential frame tolerances are not relevant in the context of this alignment.

This simple adjustment is possible only by virtue of the derailleur 10 being assembled coaxially with the rotation axis A and the consistent spacing between a reference sprocket and the locked upper chain roller 91 resulting from said coaxial assembling. In the case of a derailleur RD not coaxially assembled, the spacing between the upper chain roller and a reference sprocket would vary when rotating about the B-axis of the base element, said B-axis being a spaced apart from the rear wheel axle A.

Steps i) to iv) listed above can to a large extent be found in the sequence in FIG. 19.

FIG. 18 in a flow chart shows the sequence for determining the bicycle category and the chain length. Depending on the bicycle category (Group 1, 2 or 3), the blocking device 100 is inserted into the movable element 40 in the first position or the second position.

FIG. 18 shows an overall view of the flow chart. For improved clarity, the flow chart from FIG. 18 is divided into five portions and is once again illustrated in an enlarged manner on five separate pages in FIGS. 18A to 18E. The five portions of the flow chart are plotted using a dashed line in FIG. 18. FIGS. 18A to 18E in terms of their content correspond to the flowchart illustrated in FIG. 18.

The left strand (all data available) of the chart here refers to the case in which all required data is present, or can be downloaded by the app, respectively. In order for the user/operator to be supported here, a QR code could be scanned, or a bicycle ID could be entered, by way of which the required data can be downloaded. The required chain length can be determined depending on the bicycle model and the model year. Moreover, the bicycle is assigned to a category 1, 2 or 3.

The right strand (on bike measurement) is provided for the case in which not all required data is present and said data has to be first manually measured on the bicycle. The following items of information are thus entered in an automated or manual manner:
   fully suspended or hardtail;
   in the case of hardtails, only the length of the chain stays in the decompressed state CSL0 (no rear suspension) and the size of the chainring CR are required in order for the chain length to be determined and for the bicycle to be assigned to category 1 or 2. The blocking device 100 is oriented on the derailleur 10 according to the bicycle category output.
   This is followed by the adjustment process (setup process) in FIG. 19.
   In the case of fully suspended bicycles, the chain stay lengths in the three different spring states CSL0, CSL-max and CSLsag are required. Selection of the rear spring type; selection of the chainring size.

At the end of this adjustment process, the user knows which chain length is required and at which position the blocking element 100 is inserted.

In the case in which three or further categories/groups in the decompressed state are to be adjusted, the blocking element can be moved to a third of further adjustment position. To this end, refer to those embodiments of the blocking element which have three or more adjustment positions. Should the blocking element possess only one or two adjustment positions, it would also be conceivable for the reference sprocket to be changed and for shifting to the sixth gear to take place, for example.

This is followed by the assembling and adjusting process of the derailleur, as is illustrated in FIG. 19.

Figure 19A:
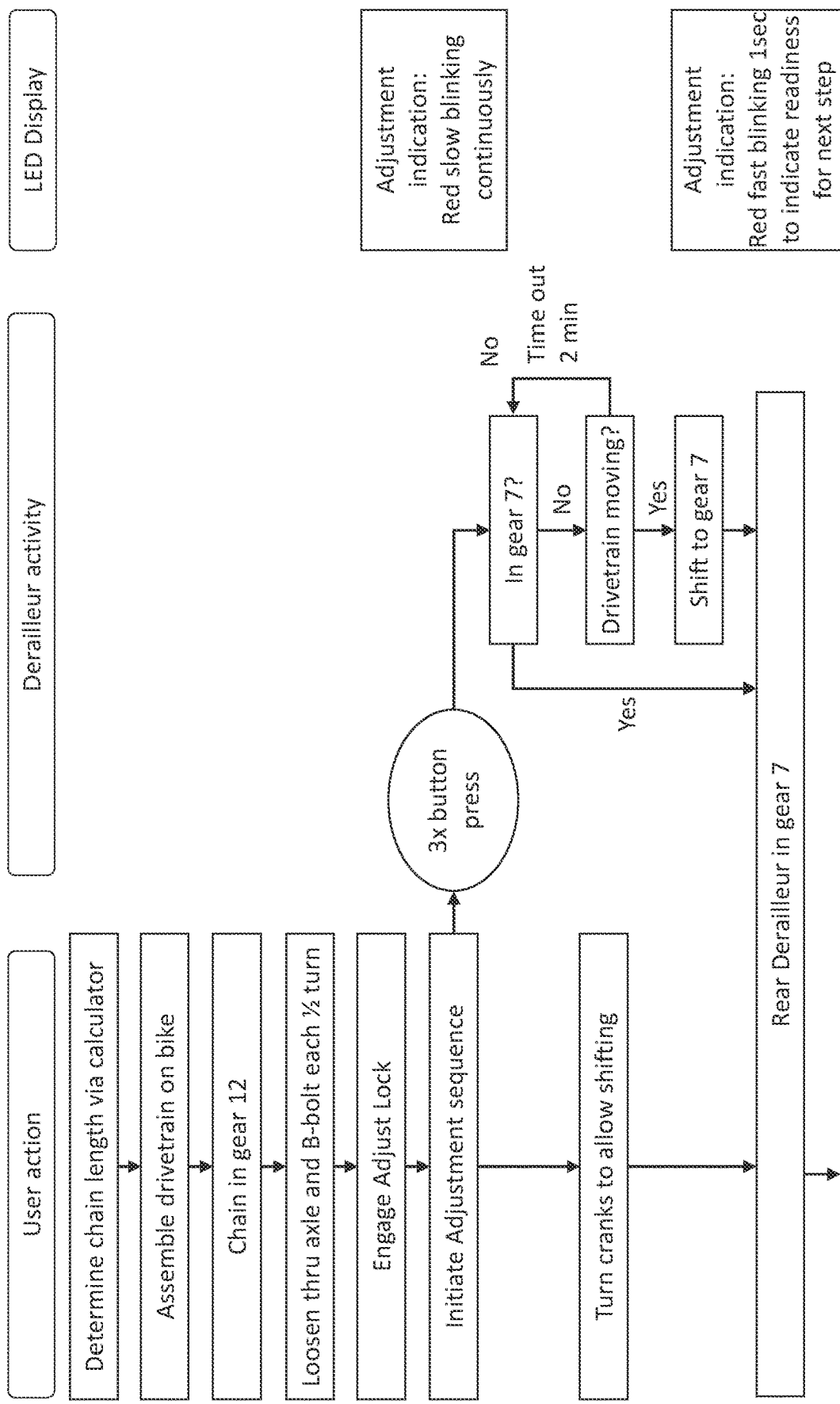
FIG. 19A shows a first enlarged portion of the flow chart from FIG. 19 (top)
Figure 19B:
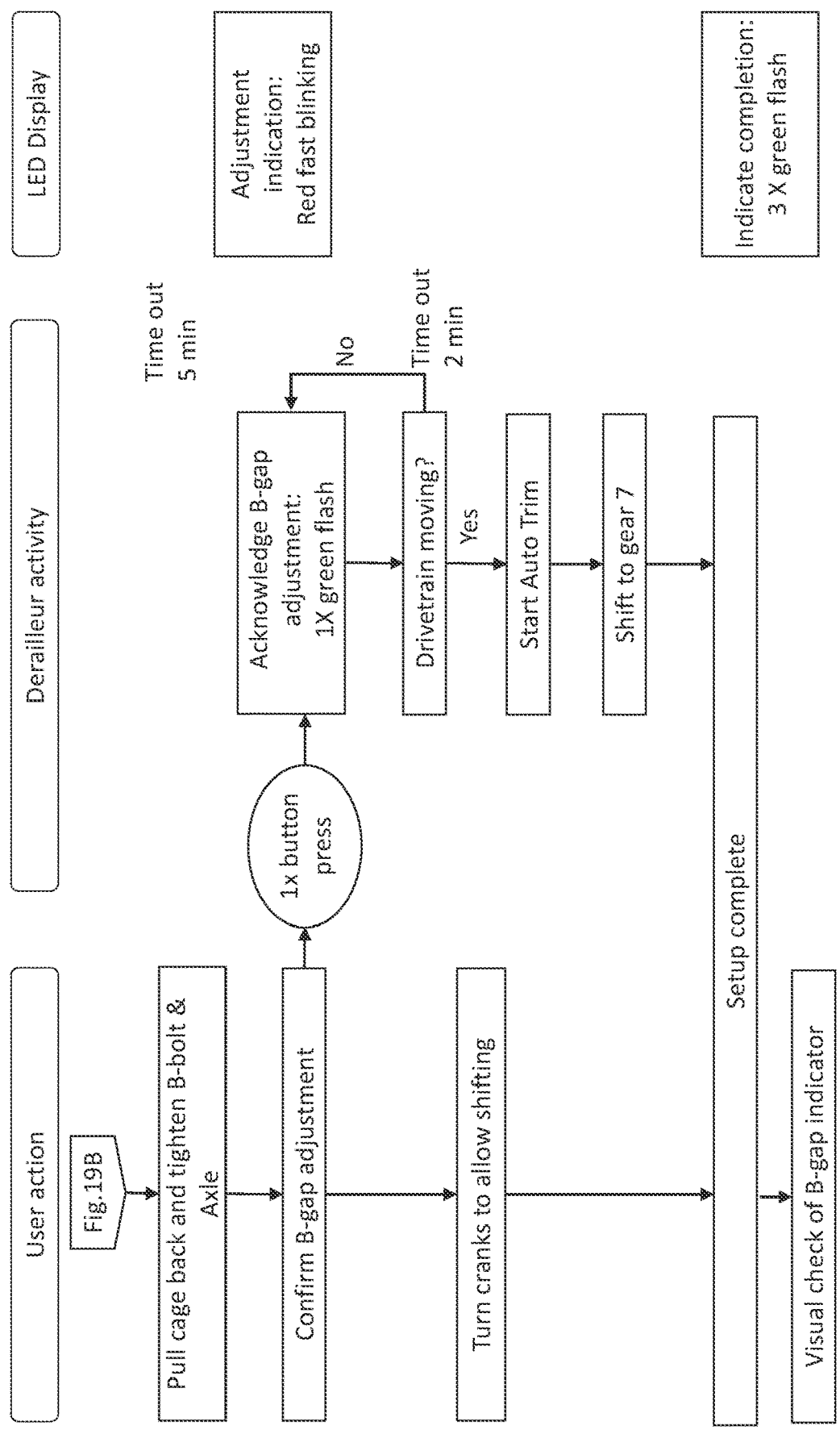
FIG. 19B shows a second large portion of the flowchart from FIG. 19 (bottom)

FIG. 19 again shows the overall view of the flowchart which for improved clarity is divided into two portions and is once again illustrated in an enlarged manner on two pages in FIGS. 19A to 19B. The two portions of the flowchart are plotted using a dashed line in FIG. 19. FIGS. 19A and 19B in terms of content correspond to the flowchart illustrated in FIG. 19.

The first step towards determining the chain length in this case has already been completed (cf. FIG. 18). Next, the drive is assembled on the bicycle and the chain is placed in the twelfth gear. The stud axle and the pin are then released, and the blocking device 100 is moved to the active setting (corresponds to steps i) to iii) as is explained in detail above). The blocking element 100 in FIG. 19 is referred to as the "adjust lock".

The adjustment sequence is subsequently initiated. This can be carried out either directly on the electric derailleur 10 (right strand) or with the aid of an app (left strand).

Both adjustment sequences take place with the derailleur in the seventh gear (reference sprocket). The reference sprocket is either approached by way of the app or by pressing the adjustment button directly on the derailleur 10. With a view to simplified handling, it is conceivable for the reference sprocket to be visually enhanced. For example, the seventh sprocket or the lock tube lying there below could be identified with a color.

When the chain is situated on the reference sprocket, the chain guide, or the cage, respectively, is retracted in the clockwise manner (in the external view) until the chain is tensioned and the pin and the stud axle are tightened (cf. steps iii) and iv) above).

The correct spacing (B-gap) is subsequently confirmed, and the adjustment is completed. The derailleur 10 can moreover have an LED which emits visual signals in order to display the correct adjustment and/or the successful completion of an operating step.

Figure 20A:
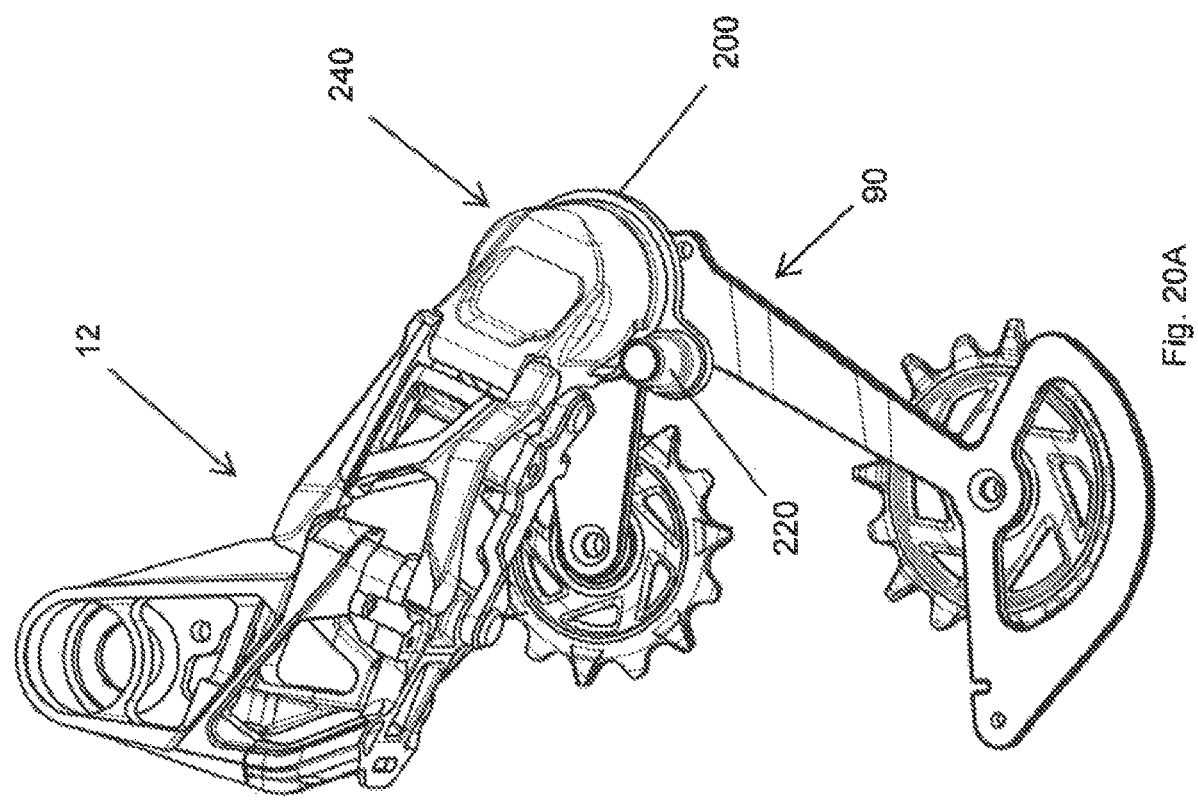
FIG. 20A shows the derailleur having a second embodiment of the blocking device.

FIG. 20A shows a perspective external view of the derailleur 12 having a second embodiment of the blocking device 200 in the form of an adjustment ring. The derailleur 20 differs from the preceding embodiment primarily in terms of the blocking device 200. Accordingly, the blocking device 200 will be primarily discussed. The reference signs of parts of identical construction are carried forward. The adjustment ring 200 is configured so as to be annular and is disposed so as to be coaxial with the P-axle 41 on the movable element 240. The adjustment ring 200 is in particular mounted on the movable element 240 so as to be rotatable about the P-axle 41. A blocking element 220 which along the longitudinal axis 212 thereof can be moved to the active setting and passive setting is disposed on the adjustment ring 200. The blocking device 200 can be positioned in a stepless manner by being rotated about the P-axle 41. The adjustment position between the blocking element 220 and the cage 90 varies depending on the angular position of the blocking device 200. Markings, or a graduation mark, which show different positions depending on the bicycle category and facilitate the adjustment could be provided on the P-knuckle 240.

Figure 20B:
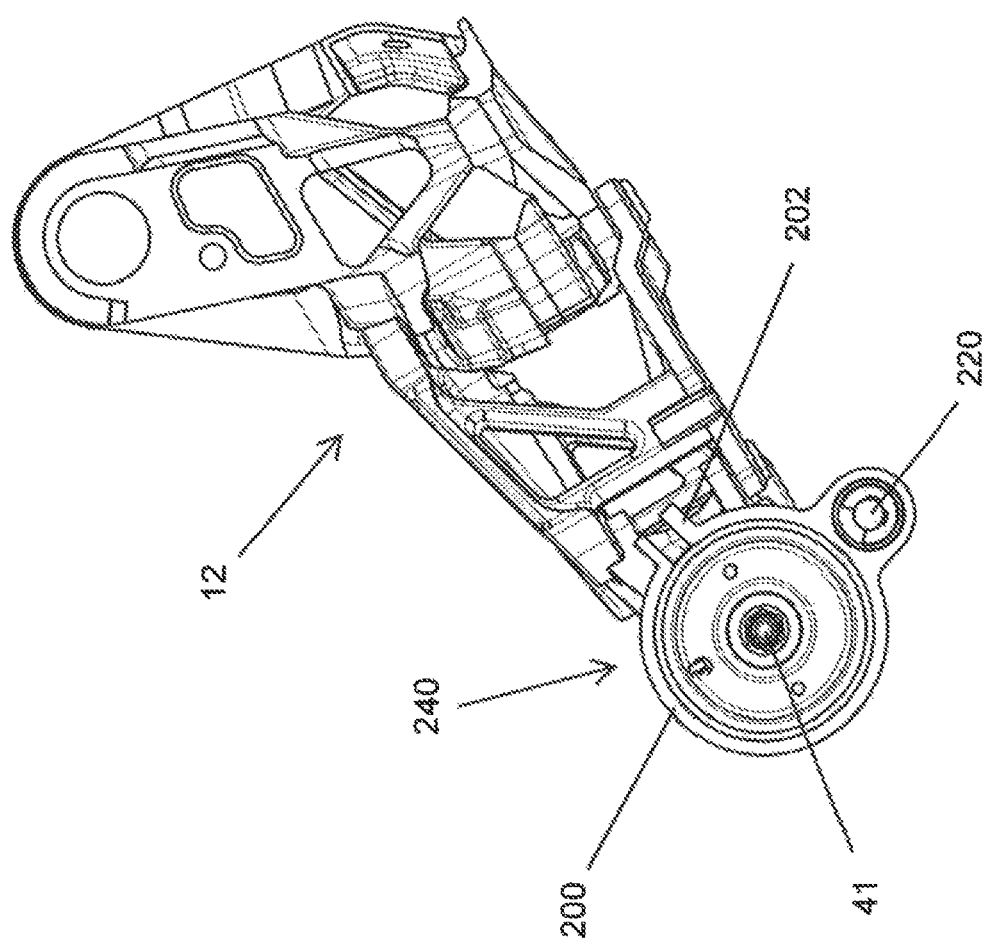
FIG. 20B shows parts of the derailleur from FIG. 20A.

FIG. 20B shows an internal view of a part of the derailleur 12 from FIG. 20A. The cage is not illustrated here for reasons of improved clarity. The adjustment ring 200 almost completely encompasses the movable element 240. A receptacle for the blocking element 220 is integrated in the adjustment ring 200. The adjustment ring 200 in the exemplary embodiment shown is configured in the manner of a clamp and opened at one location. The two ends 202 of the adjustment ring 200 can be connected by a screw (not illustrated). The adjustment ring 200 conjointly with the blocking element 220 is rotated about the P-axle 41 and moved to the correct adjustment position, depending on the bicycle category. The ends 202 of the clamp-type adjustment ring 200 are tightened at the selected position, and the blocking device 200 is established relative to the movable element 240.

The locking of the pre-tensioned blocking device 200 takes place according to the first embodiment. The blocking device 200 interacts with a detent on the cage 90 and locks the latter in a pre-determined position. The blocking element 220 shown is concentrically disposed in the housing. A rotation of the blocking element 220 by 180 degrees is dispensed with here because a multiplicity of positions are possible by virtue of the stepless adjustability.

FIG. 21 shows an internal view of the derailleur 13 having a third embodiment of the blocking device 300. The inner cage plate of the cage is not illustrated for improved clarity. The embodiment of the blocking device 300 shown is composed of a counterpart 310 which is rotatably mounted on the outer cage plate 93*a* and interacts with the blocking element 320. The counterpart 310 is mounted on the cage 90 so as to be rotatable about the rotation axis 311 and has three recesses 310*a, b, c*. The recesses 310*a, b, c* permit three different adjustment positions of the cage relative to the movable element 40. The counterpart 310 can be moved to the correct position either with a tool, or in a tool-less manner by rotation about the axis 311. In the position shown, the blocking element 320 engages with the recess 310*c*.

It would also be conceivable for the counterpart to be provided with two, four or more recesses for a corresponding number of adjustment positions.

FIG. 22 shows an internal view of the derailleur 14 having a fourth embodiment of the blocking device 400, likewise without the inner cage plate. The blocking device 400 is composed of an elongate clip 400, which is to be fastened to the outer cage plate 93*a*, and the blocking element 420. The clip 400 is releasably connected to the cage plate 93*a*, the clip 400 in particular encompassing the cage plate 93*a*. The clip 400 has two ends which project dissimilarly far beyond the periphery of the cage plate 93*a*, said ends having a respective recess 410*a* and 410*b*. The clip 400 can be rotated by 180 degrees and be pushed onto the cage plate 93*a* in two different positions. Depending on the attachment, the blocking element 420 interacts with the first recess 420*a* or the second recess 420*b*. As a result thereof, the derailleur 14 can be locked in two different positions.

FIG. 23 shows the derailleur 15 having a fifth embodiment of the blocking device 500. The inner cage plate has been omitted. The embodiment of the blocking device 500 shown is composed of a counterpart in the form of the lever 510 which is rotatably mounted on the outer cage plate 93*a* and interacts with the blocking element 520. The lever 510 is mounted on the cage 90 so as to be rotatable about the rotation axis 511 and has three recesses 510*a, b, c*. The recesses 510*a, b, c* disposed next to one another on the lever 510 permit three different adjustment positions of the cage relative to the movable element 40. The counterpart 510 can be moved to the correct position and fixed therein either with a tool, or in a tool-less manner by a rotation about the axis 511. In the position shown, the blocking element 520 engages with the recess 510*c*. It would also be conceivable for the counterpart to be provided with two, four or more recesses for a corresponding number of adjustment positions.

FIG. 24 shows a derailleur 16 having a sixth embodiment of the blocking device 600. The inner cage plate is not illustrated. The embodiment of the blocking device 600 shown is composed of a counterpart in the form of a slide 610 which is mounted so as to be displaceable along the cage plate 93*a* and interacts with the blocking element 620. The slide 610 is mounted so as to be displaceable along the cage plate 93*a* and/or has three recesses 610*a, b, c*. The recesses 610*a, b, c* disposed next to one another on the slide 610 permit three different adjustment positions of the cage relative to the movable element 40. The slide 610 which is additionally displaceable along the cage moreover permits further adjustment positions. In the position shown, the blocking element 620 is engaged with the uppermost recess 610*c*. It would also be conceivable for the slide to be provided with one, two, four or more recesses for a corresponding number of adjustment positions. Stepless adjustment would also be possible by way of only one recess and a slide 610 which is displaceable along the cage.

Figure 25:
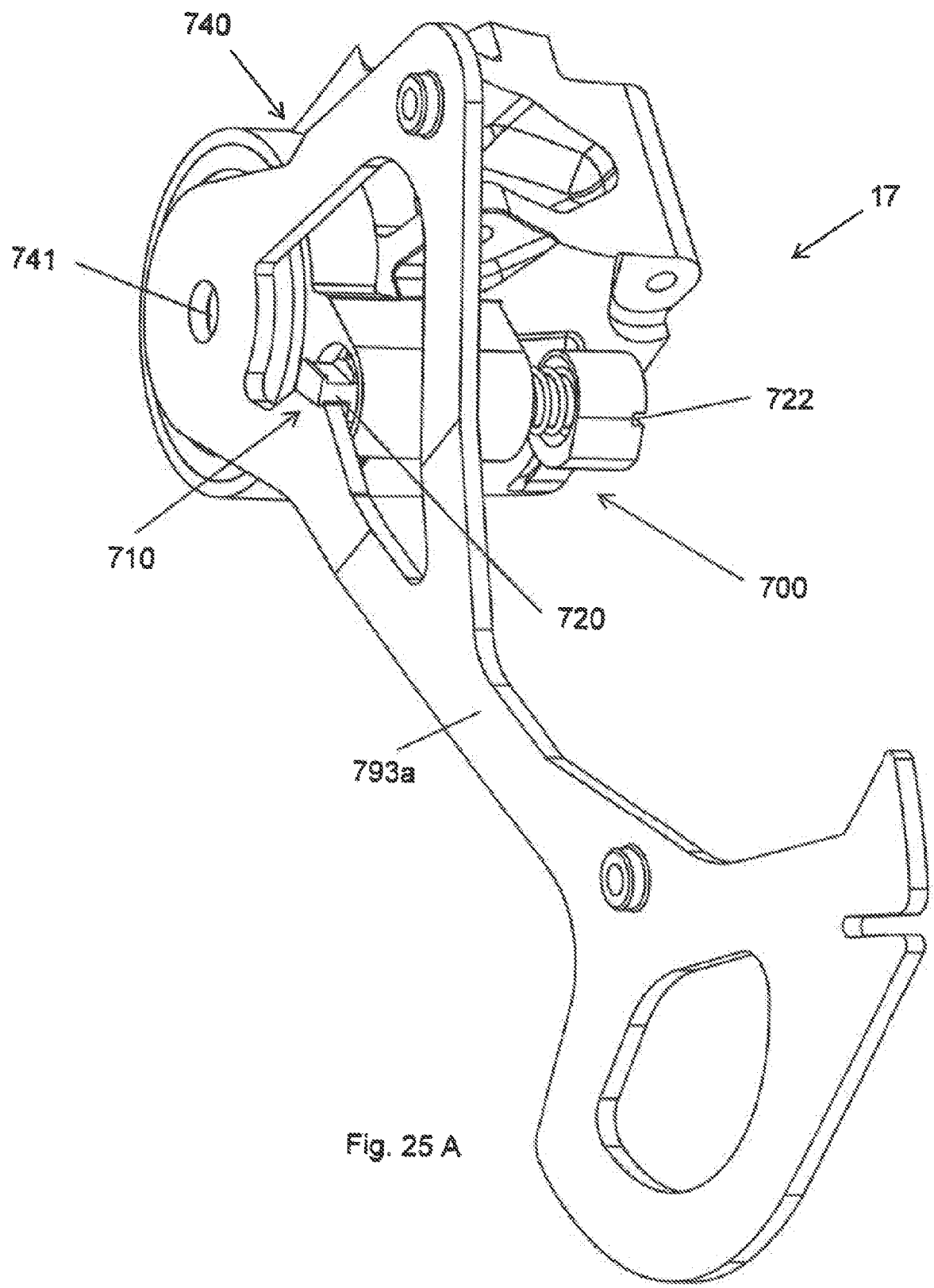
FIG. 25A shows the derailleur having a seventh embodiment of the blocking device—first adjustment position, active setting.
FIG. 25B shows a sectional view of the derailleur from FIG. 25A.
Figure 25:
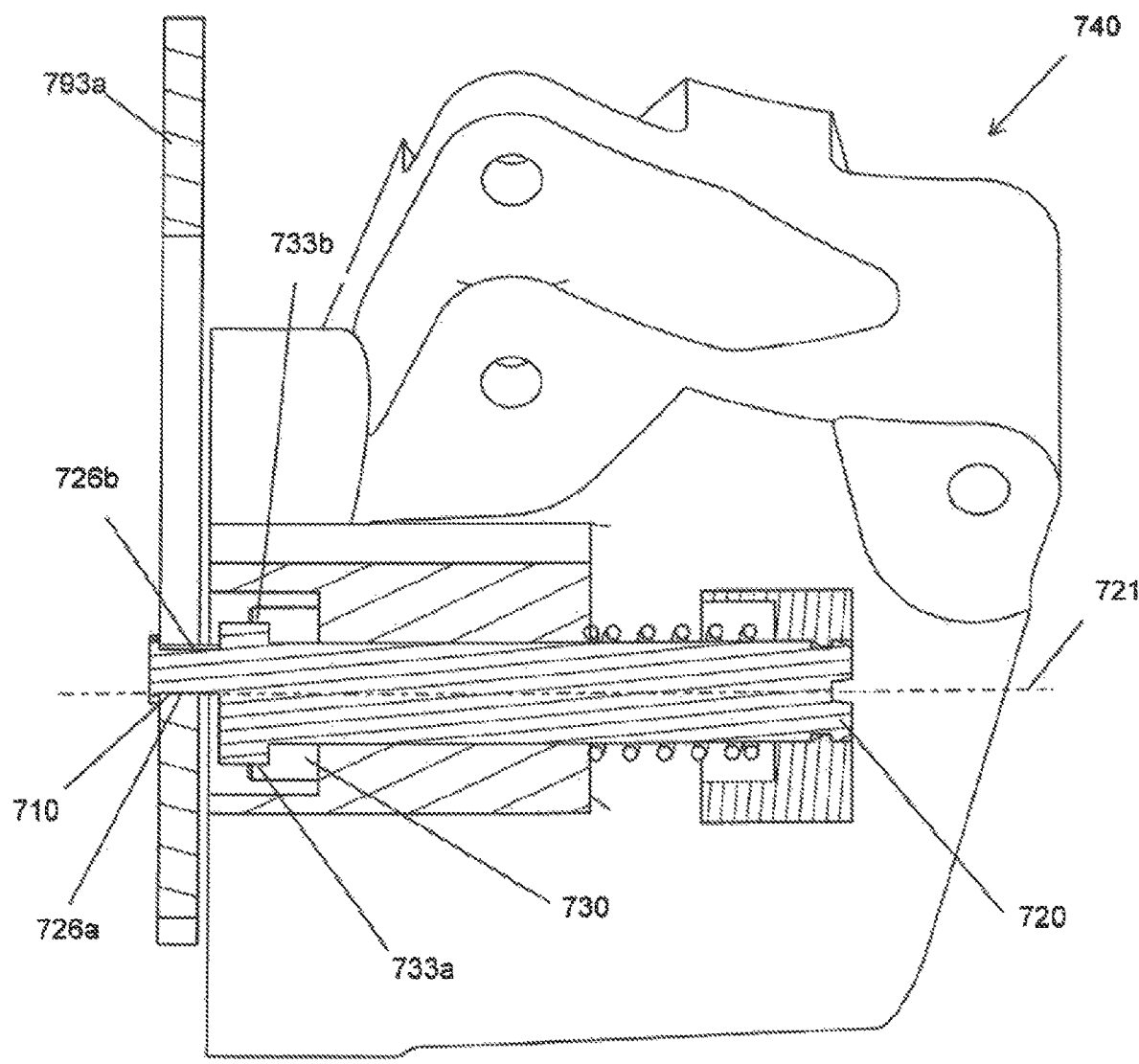
Figure 26:
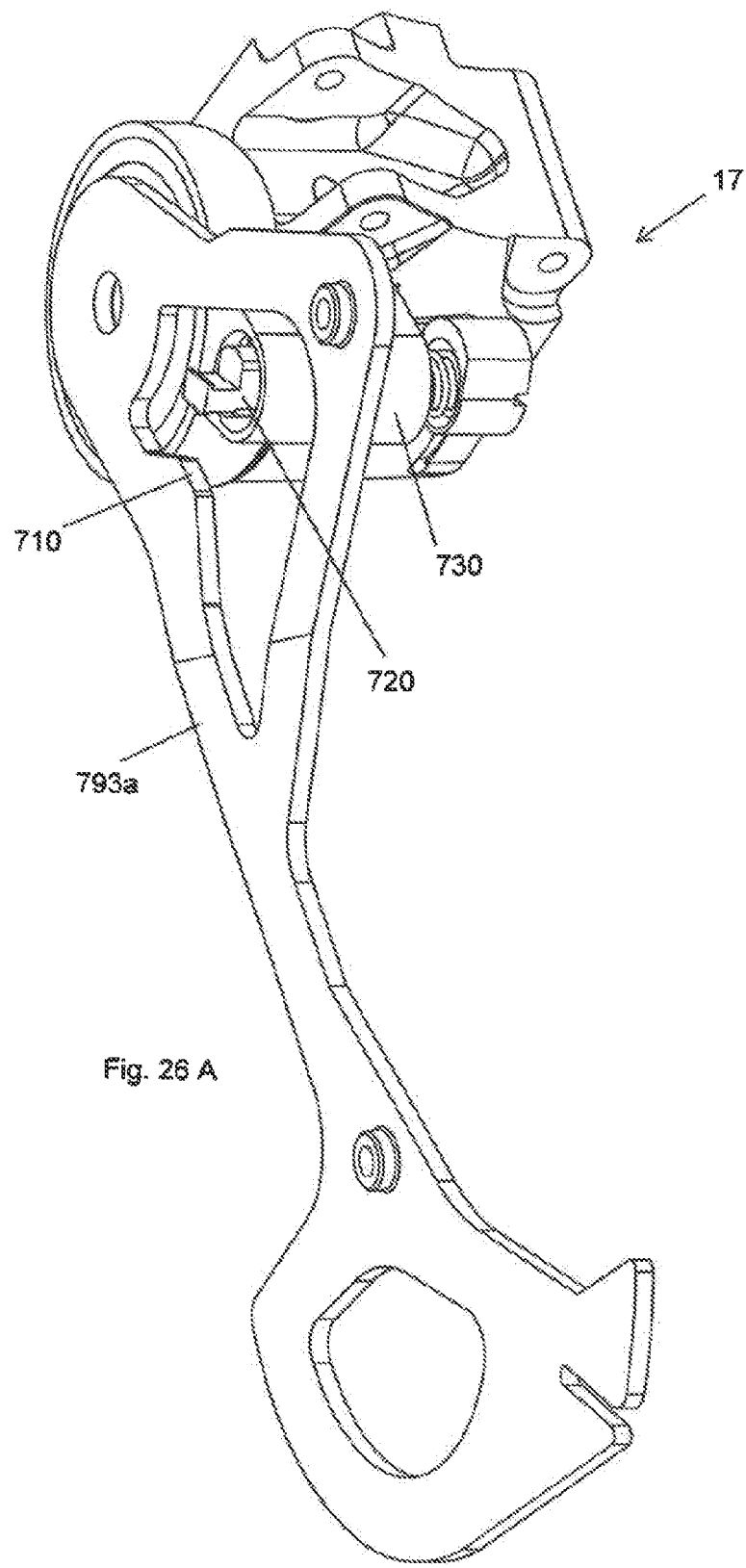
FIG. 26A shows the derailleur having a seventh embodiment of the blocking device—changeover setting between a first position and a second position.
FIG. 26B shows a sectional view of the derailleur from FIG. 26A.
Figure 26:
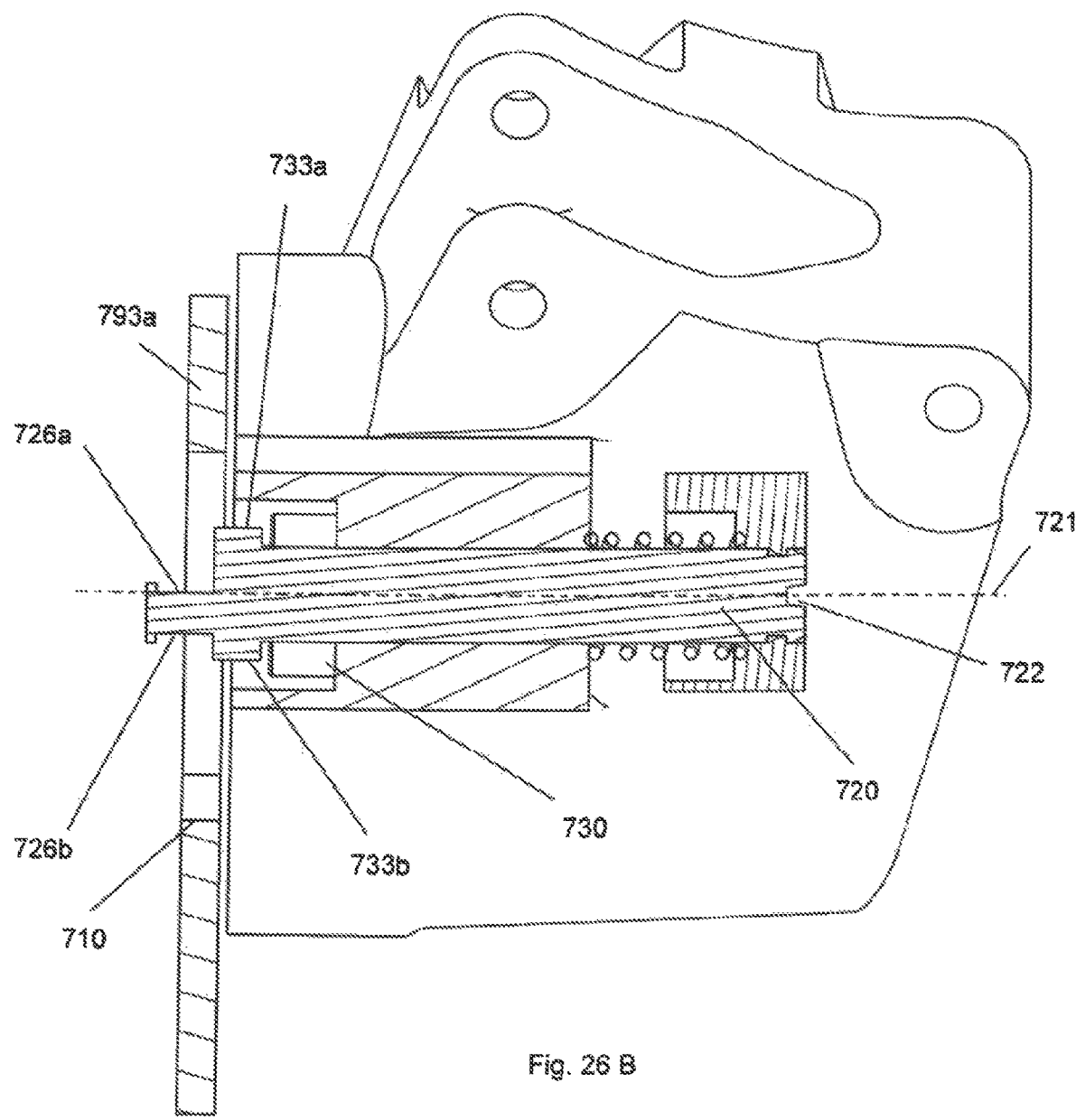
Figure 27:
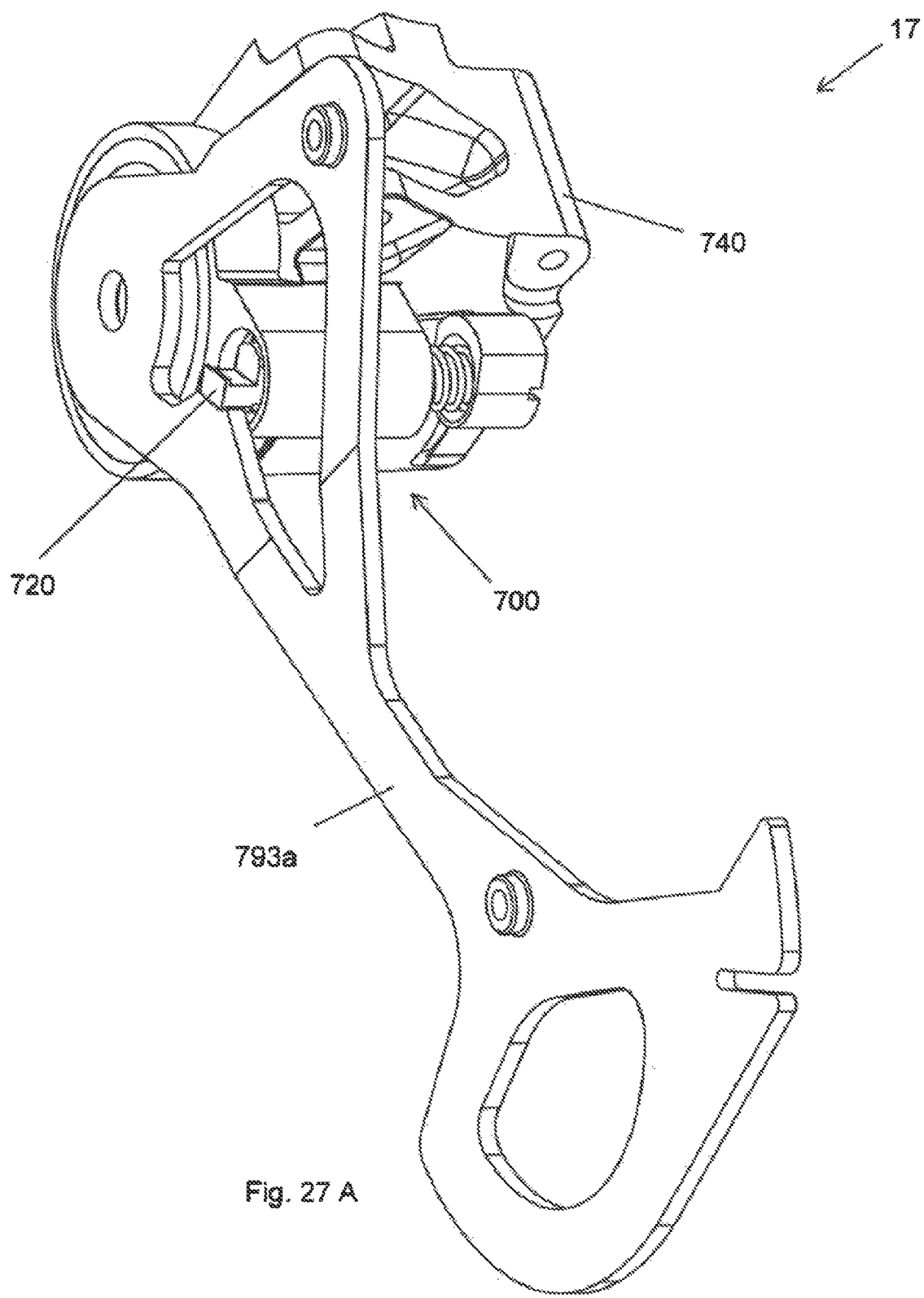
FIG. 27A shows the derailleur having a seventh embodiment of the blocking device—second adjustment position, active setting.
FIG. 27B shows a sectional view of the derailleur from FIG. 27A.
Figure 27:
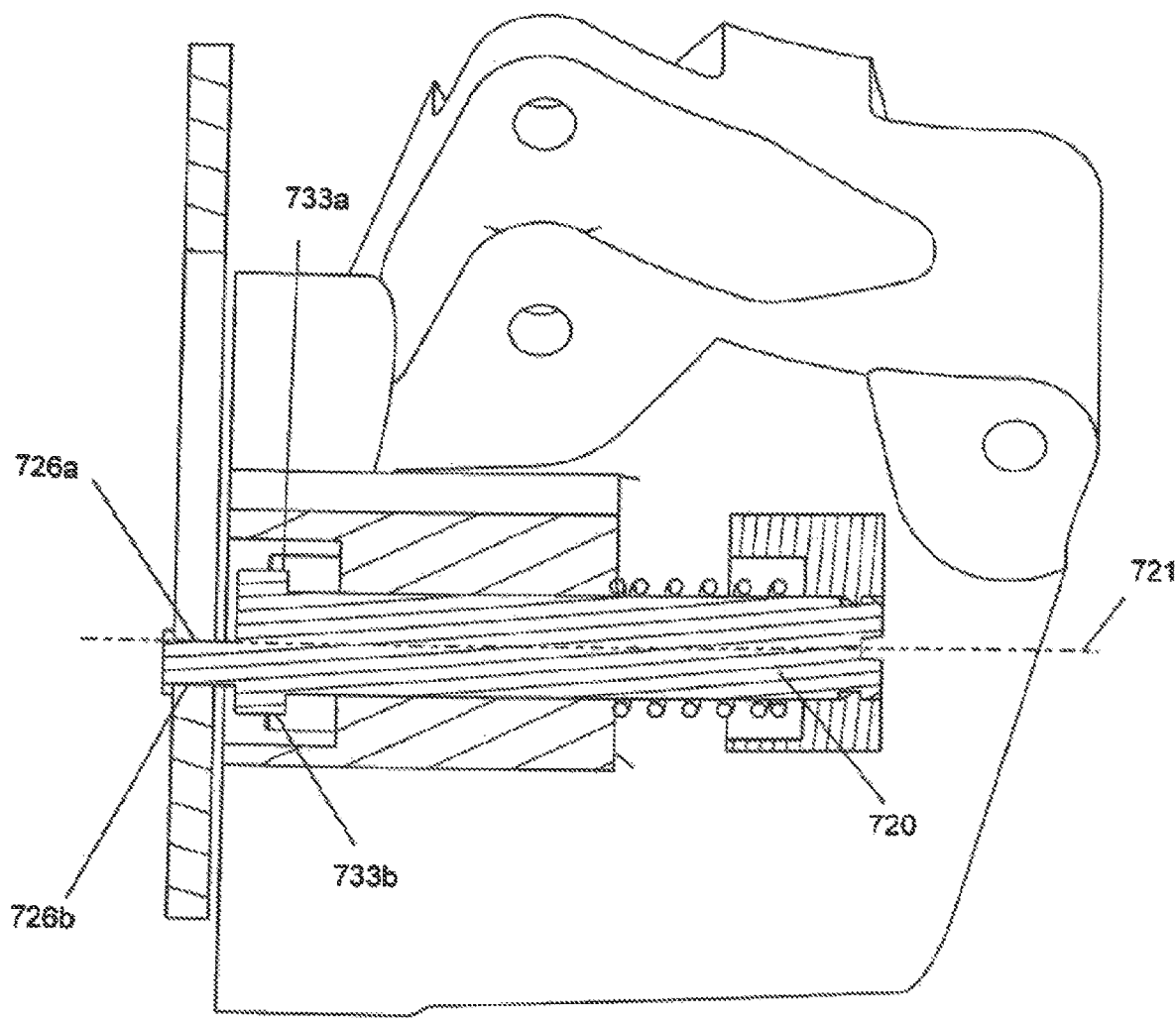

FIGS. 25, 26 and 27 show views of a derailleur 17 having a seventh embodiment of the blocking device 700 in different positions. Similar to the blocking device 100 of the first embodiment, the blocking device 700 can be disposed in a first adjustment position and in a second adjustment position which is rotated by 180 degrees in relation to said first adjustment position. In the seventh embodiment it is advantageous that the blocking element 720 cannot be lost because the latter is not released from the derailleur 17 when changing from the first position to the second position.

FIG. 25A shows a perspective internal view of parts of the derailleur 17. The upper part of the derailleur as well as parts of the cage are not illustrated for improved clarity. FIG. 25B shows a section through the components illustrated in FIG. 25A. The interaction of the detent faces 726 and the orientation faces 733 is derived from the sectional illustration.

The blocking device 700 in FIG. 25A is situated in the active setting and in a first adjustment position. The blocking device 700 comprises the blocking element 720 which is received in the movable element 740 and in the active setting interacts with a counterpart detent 710 on the cage.

The blocking element is configured as an eccentric pin 720. The eccentric pin 720 has at least two detent faces 726*a* and 726*b* which in the active setting come into contact with the cage plate 710. The detent faces 726*a, b* on the pin 720 are disposed at dissimilar spacings from the central axis, or a longitudinal axis 721, respectively, of the eccentric pin 720. In this exemplary embodiment, the spacing of the first detent face 726*a* from the eccentric pin axis 721 is approximately 0 mm, and the spacing of the second detent face 726*b* is approximately 2 mm.

The detent faces 726*a* and *b* on the eccentric pin 720 run so as to be parallel to a counterpart detent face 710 on the derailleur cage. The counterpart detent face 710 is situated on the lower cage arm of the outer cage plate 793*a*. The parallel disposal of the faces 726 and 710 results in a planar detent situation between the derailleur cage and the eccentric pin 720, irrespective of the adjustment position of the eccentric pin 720.

In order for the correct rotational orientation of the eccentric pin 720 in the movable element 740 to be guaranteed, interacting orientation faces 733*a, b* are provided on the eccentric pin 720 and in the pin housing 730 which receives the eccentric pin 720. As long as the orientation faces 733*a, b* are engaged as in FIG. 25, the eccentric pin 720 in rotational terms is established relative to the movable element 740. The pin 720, which is axially pre-tensioned towards the outside, at the axially inner end has a protrusion which engages behind the outer cage plate 793*a* and thus locks the latter in the active setting.

FIGS. 26A and B show the corresponding views of the derailleur 17 from FIG. 25 in a changeover setting between the first position and the second position. In the setting shown, the blocking element 720 has already rotated by 180 degrees to the second position but has not yet been established relative to the pin housing 730 again by the orientation faces 733.

In order for the adjustment position to be changed, the derailleur cage is positioned such that the eccentric pin 720 can be moved without impediment in the axial direction, thus does not interact with the cage. In the exemplary embodiment shown, the eccentric pin 720 to this end is situated in a window of the outer cage plate 793*a*. The eccentric pin 720 is pushed axially inwards along the longitudinal axis 721 thereof, and counter to the pre-tensioning, and thus out of the pin housing 730 until the orientation faces 733*a, b* on the eccentric pin 720 and in the pin housing 730 no longer overlap, or have been brought to disengage, respectively. The eccentric pin 720 can now be rotated by 180 degrees so as to be moved to the second adjustment position. The second detent face 726*b* in the second adjustment position faces the counterpart detent 710. The pin 720 can be twisted with a tool, or in a tool-less manner. To this end, the compression end of the pin 720 can be equipped with a tool interface 722. When the eccentric pin 720 is relieved of the axial pressure, said eccentric pin 720 by virtue of the pre-tensioning moves back such that the orientation faces 733*a* and *b* overlap, or are engaged, respectively.

The second adjustment position of the eccentric pin 720 is illustrated in FIGS. 27A and B. The pin 720 is rotated by 180 degrees in comparison to the first position such that the second detent face 726*b* interacts with the counterpart detent 710 on the cage plate 793*a*. The protrusion on the axially inner end of the eccentric pin 720 engages behind the cage plate 793*a*. It can be seen from the sectional view in FIG. 27B that the orientation faces 733*a* and *b* overlap, the pin 720 thus being rotationally established in the housing 730. By virtue of the dissimilar spacings of the detent faces 726*a* and *b* from the longitudinal axis 721 of the pin 720, the cage, depending on the position, is locked relative to the movable element in a different setting.

Figure 28:
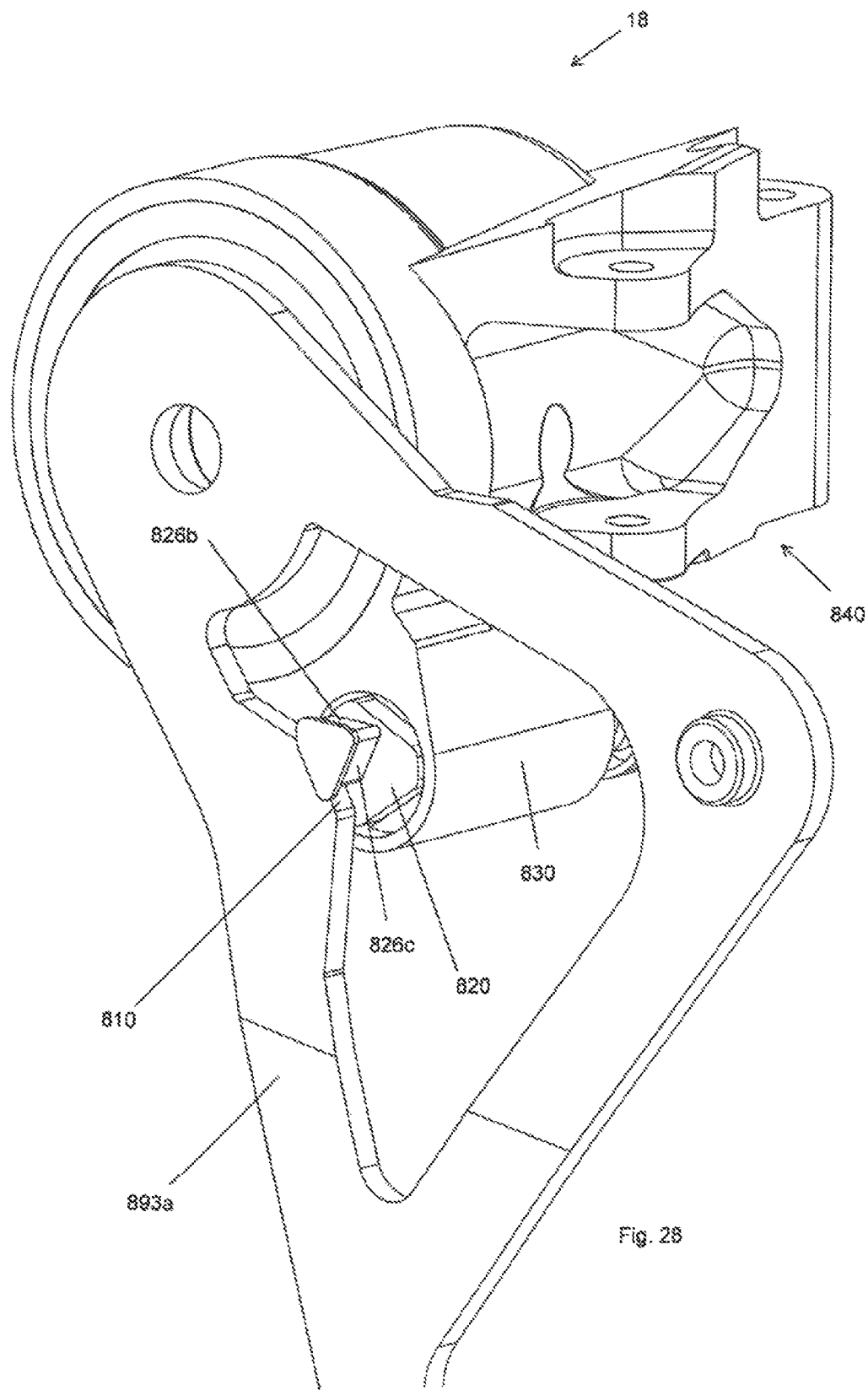
FIG. 28 shows the derailleur having an eighth embodiment of the blocking device.

FIG. 28 shows a derailleur 18 having a further embodiment of the blocking device 800. The blocking device 800 largely corresponds to the preceding embodiment 700. The blocking element 820 has three (instead of two) detent faces 826*a, b* and *c*. The trilateral construction of the eccentric pin 820 permits three adjustment positions (eccentric triangle). The three detent faces 826*a, b*, and *c* are disposed at three dissimilar spacings from the longitudinal axis of the pin 820. Depending on which detent face 86*a, b* or *c* interacts with the counterpart detent 810 on the cage plate 893*a*, the cage assumes a different adjustment position relative to the movable element 840. The pin 820 on the axially inner end thereof is provided with protrusions which engage behind the cage plate and thus counteract the axial pre-tensioning of the pin 820. In the view shown, the first detent face 826*a* by way of the protrusion assigned thereto engages with the counterpart detent 810. The construction of the housing 830 follows the trilateral construction of the pin 820. Accordingly, three orientation faces are also in each case provided on the pin 820 and on the internal side of the housing 830. The changeover from one position to the next follows the principle of the preceding embodiment.

Alternatively, the orientation faces of the two preceding exemplary embodiments on the eccentric pin and/or in the housing could be conceived so as to be elastic, for example by way of correspondingly thin wall thicknesses, such that the form-fit can be overcome by a corresponding torque. In this case, the adjustment position can also be changed without pushing the pin out of the housing. In order for the increased torque to be applied, the eccentric pin is preferably provided with the corresponding tool interface, for example a hexagonal socket or Torx.

Figure 29A:
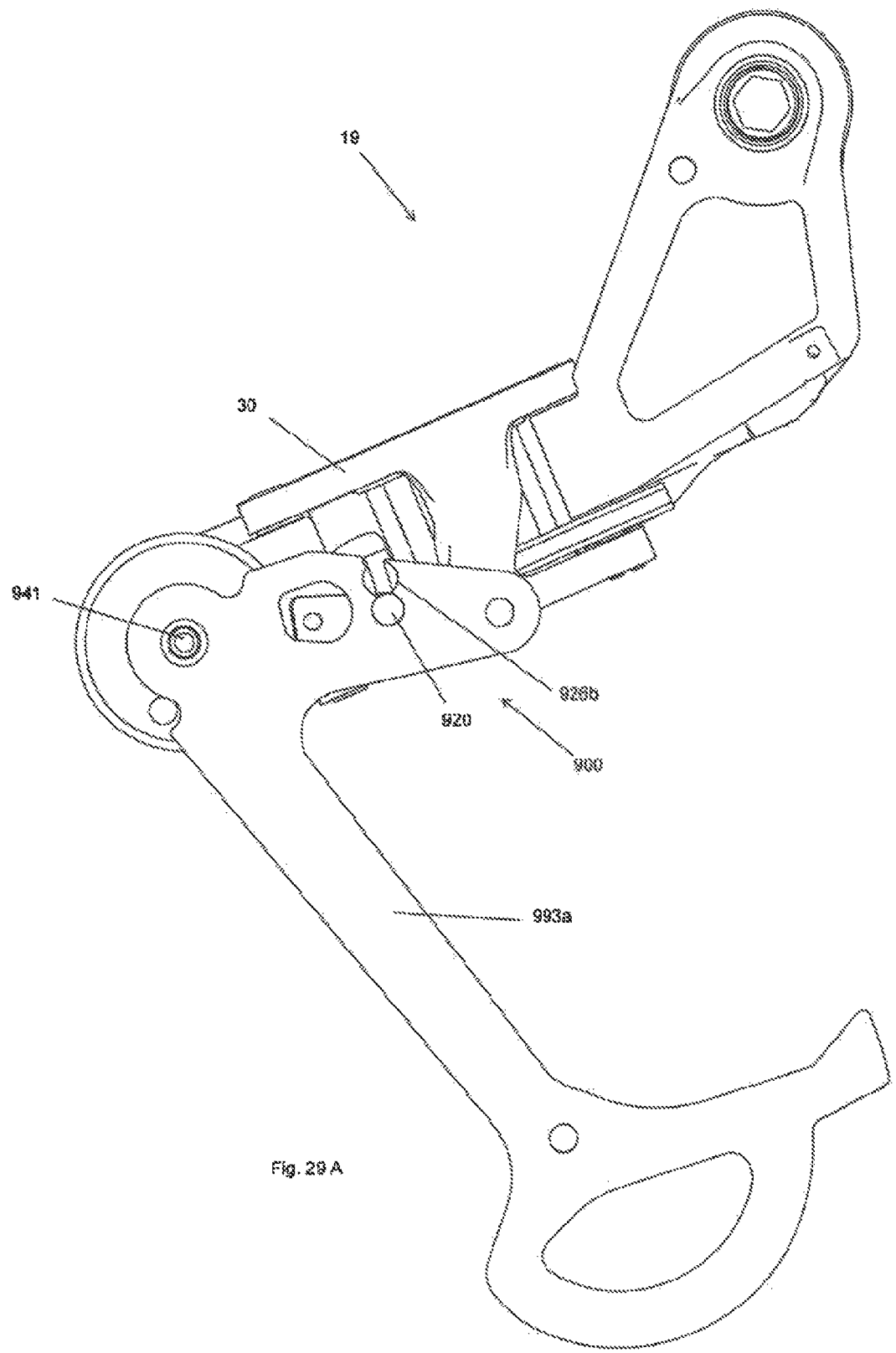
FIG. 29A shows the derailleur having a ninth embodiment of the blocking device.
Figure 29:
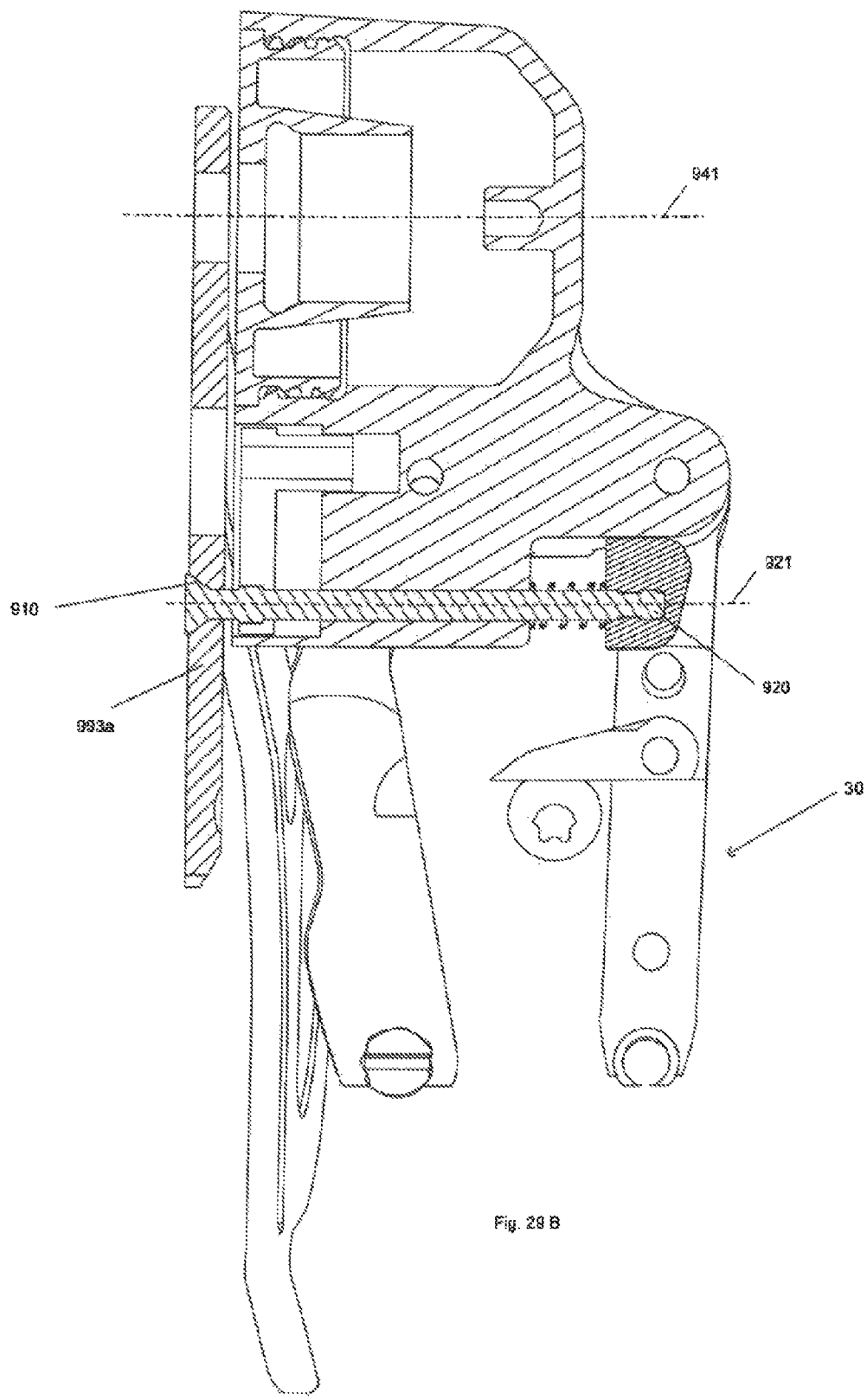
FIG. 29B shows a sectional view of the derailleur from FIG. 29A.

Parts of a derailleur 19 having a ninth embodiment of the blocking device 900 are illustrated in the lateral view and in the sectional view in FIGS. 29A and B. The blocking device is composed of a blocking element 920 and locking openings 926*a* and *b* on the cage plate 993*a*. As opposed to the preceding exemplary embodiments, the locking openings 926*a* and *b* are disposed on the upper cage arm, between the upper guide rollers (not shown) and the P-axle 941. The blocking element is embodied as a spring-loaded pin 920. The pin 920 along the longitudinal axis 921 thereof is pre-tensioned in an axially outward manner. The pin 920 is preferably positioned so as to be as far as possible from the P-axle 941 because the centering faces 910 of the locking openings 926 could otherwise overlap. In order for a compact construction mode of the derailleur 19 to be implemented, the pin 920 is placed within the pivot mechanism 30. The locking openings 926*a* and *b* on the derailleur cage have conical centering faces 910 which correlates to the conical face 910 on the centering head of the pins 920—cf. in this context the sectional view in FIG. 29B. As a result of the spring tension, the centering head of the pin 920 is held in the selected locking position. Three or more locking openings which permit a corresponding number of adjustment positions would also be conceivable.

Figure 30:
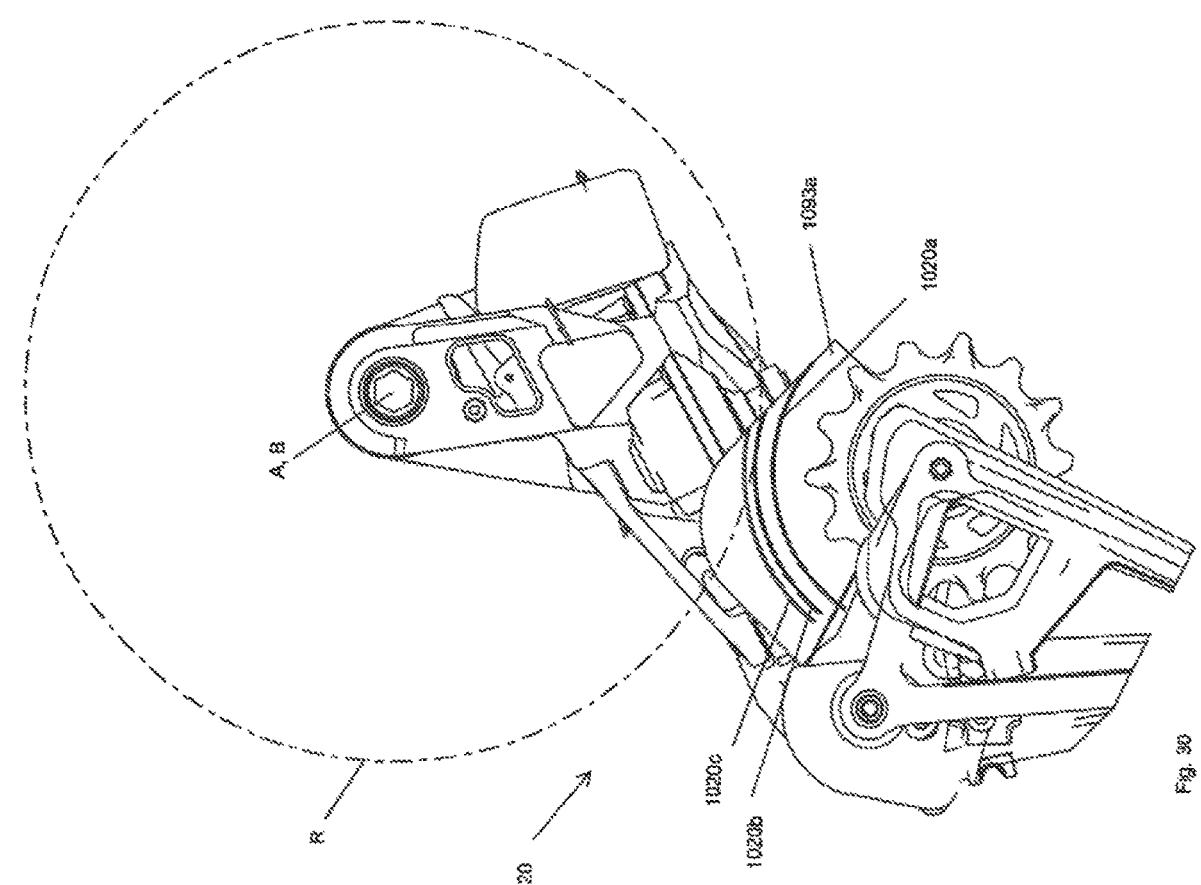
FIG. 30 shows the derailleur having a tenth embodiment of the blocking device.

FIG. 30 shows an internal view of a fragment of the coaxial derailleur 20 having an alternative adjustment device 1000. The outer cage plate 1093*a* here is provided with three markings 1020*a, b* and *c*. Each bicycle category is assigned one marking 1020*a, b* or *c*. In order for the derailleur 20 to be adjusted, a bicycle chain, not shown here, engages with the indicated reference sprocket R and runs in an S-shaped manner through the derailleur. The entire derailleur 20 is rotated about the rear wheel axle A towards the rear (in the internal view in the anti-clockwise manner), counter to the chain tension, until the selected marking 1020*b* is congruent with the external circumference of the reference sprocket R. One of the central sprockets, in particular the sixth or seventh sprocket, is suitable as the reference sprocket R. The number of markings predefines the number of adjustment positions.

In the case of a non-coaxial derailleur, the rotation of the derailleur for the adjustment does not take place about the rear wheel axle A but about the B-axis of the base element but is spaced apart from the rear wheel axle A. In the case of coaxial derailleurs, the rear wheel axle and the B-axis are congruent.

As an alternative to the markings on the cage plate per se, the three or more markings can also be applied to a separate adjustment template.

Figure 31:
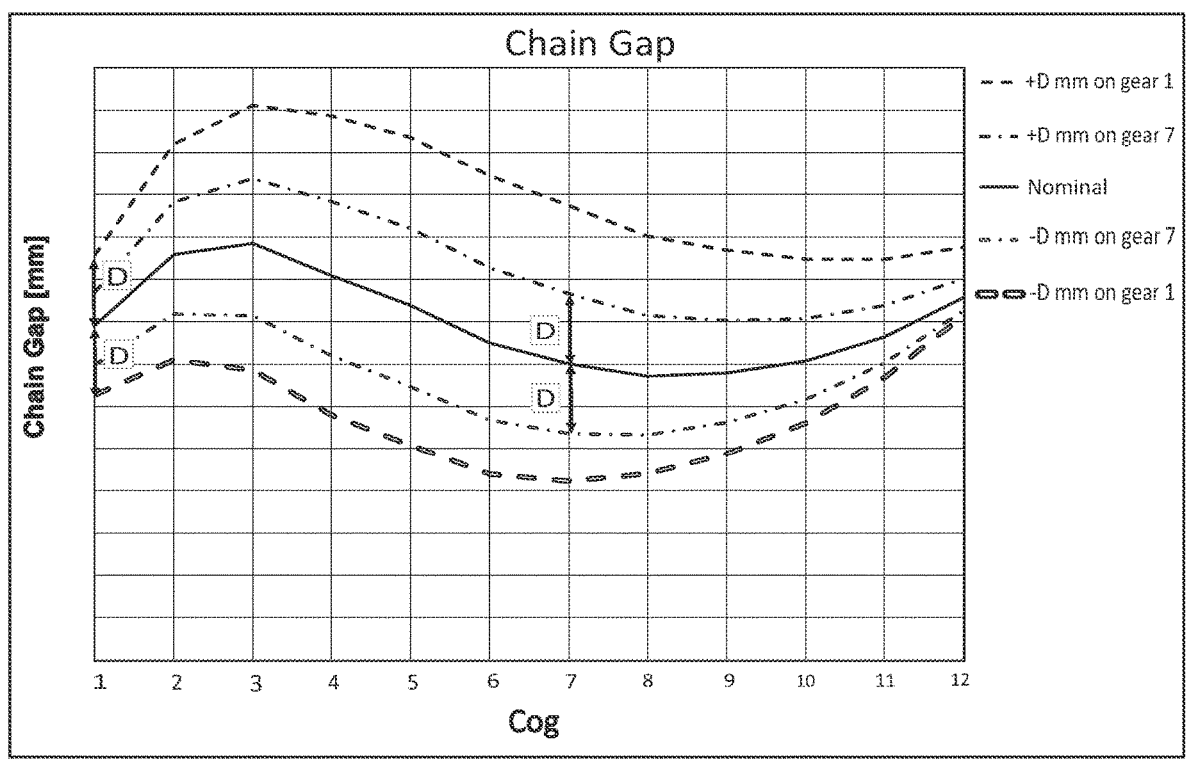
FIG. 31 shows a diagram for the adjustment in the first gear and in the seventh gear.

The diagram in FIG. 31 shows the advantages of the derailleur adjustment on one of the central sprockets, for example on the seventh sprocket, or in the seventh gear (gear 7), as compared to the adjustment of the largest sprocket, or the first sprocket (gear 1), respectively, as has been customary to date. The chain gap, or the B-gap, was in each case measured in the first gear and in the seventh gear, having a deviation D of plus/minus 3 mm. In the adjustment in the first gear, the spread is significantly larger than in the seventh gear. The spread is understood to be the spacing between the upper graph and the lower graph of the first gear and the seventh gear, respectively. A smaller spread is equal to a constant chain gap and thus to an increased accuracy. Modern multi-sprocket assemblies have an increasing number of 12 or more sprockets. Moreover, the large sprockets have a high number of 50, 52 or more teeth. A constant chain gap across all gears gains relevance in terms of shifting precision by virtue of the increasing multi-sprocket assemblies.

The following examples serve for highlighting the disclosure:

1. Rear derailleur (10) for a bicycle gearshift mechanism, including: a base element (20) which is attachable to a bicycle frame; a movable element (40) which is coupled to the base element (20) and repositionable relative to the latter; a chain guide assembly (90) which is coupled to the movable element (40) and is pivotable relative to the latter about a pivot axle (41); a pre-tensioning installation by way of which the chain guide assembly (90) is pre-tensioned relative to the movable element (40) about the pivot axle (41) to an initial setting, wherein the chain guide assembly (90), counter to a tensioning force of the pre-tensioning installation, is pivotable from the initial setting about the pivot axle (41) to various operating settings; and at least one blocking device (100) which is provided for blocking the chain guide assembly (90) in at least one blocking setting, deviating from the initial setting, relative to the movable element (40), wherein the blocking device (100) has a blocking element (120) which is repositionable between a passive setting in which said blocking device (100) releases the chain guide assembly (90) relative to the movable element (40), and at least one active setting in which said blocking device (100) holds the chain guide assembly (90) in the at least one blocking setting.

2. Rear derailleur (10) according to the preceding example, where the chain guide assembly (90) has at least one contact element, in particular in the form of an outer cage plate (93a), or an opening in the cage plate (93a), which for blocking the chain guide assembly (90) in the at least one blocking setting interacts with the blocking element (120) or is able to be brought to engage with the latter.

3. Rear derailleur (10) according to one of the preceding examples, where the blocking device (100) is disposed on the movable element (40), in particular mounted in a receptacle opening (43) of the movable element (40).

4. Rear derailleur (10) according to one of the preceding examples, where the blocking element (120) is repositionable in the direction of the pivot axle (41) or parallel to the latter.

5. Rear derailleur (10) according to one of the preceding examples, where the blocking element (120) along a longitudinal axis (121) is repositionable between the active setting and the passive setting.

6. Rear derailleur (10) according to one of the preceding examples, where the blocking device (100) furthermore has a pin housing (130) for mounting the blocking element (120).

7. Rear derailleur (10) according to one of the preceding examples, where the blocking element (120), preferably by a spring installation (150), is pre-tensioned to the passive setting.

8. Rear derailleur (10) according to one of the preceding examples, where the spring installation (150) is disposed between the pin housing (130) and the blocking element (120), and pre-tensions the blocking element (120) in relation to the pin housing (130) in the passive setting.

9. Rear derailleur (10) according to one of the preceding examples, where the blocking device (100) has a longitudinal axis (101), and the blocking element (120) has a longitudinal axis (121), and the two longitudinal axes (101, 121) run so as to be mutually spaced apart and mutually parallel.

10. Rear derailleur (10) according to one of the preceding examples, where the blocking element (120) has a longitudinal axis (121), and the pin housing (130) has a housing longitudinal axis (131), and the two longitudinal axes (121, 131) run so as to be mutually spaced apart and mutually parallel.

11. Rear derailleur (10) according to one of the preceding examples, where the blocking element (120) is eccentrically mounted in the pin housing (130).

12. Rear derailleur (10) according to one of the preceding examples, where the blocking element (120) along the longitudinal axis (121) thereof is repositionable relative to the pin housing (130).

13. Rear derailleur (10) according to one of the preceding examples, where the blocking element (120) is formed by a thrust pin which is configured having a contact face (126) by way of which said thrust pin in the at least one blocking setting for blocking the chain guide assembly (90) relative to the movable element (40) engages in a form-fitting of force-fitting manner on one of these components, in particular on an edge or an opening of the outer cage plate (93a) of the chain guide assembly (90).

14. Rear derailleur (10) according to one of the preceding examples, where the blocking element (120) in a first blocking setting engages on an upper cage arm (94), between an upper chain guide roller (91) and the pivot axle (41), wherein the first blocking setting is assumed for removing the rear wheel.

15. Rear derailleur (10) according to one of the preceding examples, where the blocking element (120) in a second blocking setting engages on a lower cage arm (95), between a lower chain guide roller (92) and the pivot axle (41), wherein the second blocking setting is assumed for adjusting of the rear derailleur (10) relative to a multi-sprocket assembly.

16. Rear derailleur (10) according to one of the preceding examples, where the thrust pin (120) for manual activation has a compression face/compression end (122).

17. Rear derailleur (10) according to one of the preceding examples, where the thrust pin (120) by way of a locking ring (140) is secured in the axial direction relative to the pin housing (130).

18. Rear derailleur (10) according to one of the preceding examples, where the pin housing (130) has an elastic latching cam (134).

19. Rear derailleur (10) according to one of the preceding examples, where the blocking device (100), composed of the blocking element (120) and the pin housing (130), is able to be mounted in a first position or in a second position on the movable element (40), in particular in a receptacle opening (43) of the movable element (40).

20. Rear derailleur (10) according to one of the preceding examples, where the elastic latching cam (134) of the pin housing (130) in the first position interacts with a first undercut (44a), or in the second position interacts with a second undercut (44b), in a receptacle opening (43) of the movable element (40) so as to secure the blocking device (120) in the axial direction relative to the movable element (40).

21. Rear derailleur (10) according to one of the preceding examples, where the derailleur (10) is configured for coaxial assembling on a rear wheel axle (A) of a bicycle, and the base element (20) includes a first connection end for coaxial assembling on the rear wheel axle (A), and a second connection end for coupling to a pivot mechanism (30).

22. Rear derailleur (10) according to the preceding example, and where the first connection end of the base element (20) has a first arm and a second arm, said arms in the axial direction being disposed so as to be mutually spaced apart, wherein the first arm in the state assembled on the frame (1) is situated on an axially internal side of the frame (1), and the second arm is situated on an axially external side of the frame (1).

23. Rear derailleur (10) according to one of the two preceding examples, where the second connection end of the base element (20) has a first axle receptacle (29a) for a first pivot axle (31) of the pivot mechanism (30), and a second axle receptacle (29*a*) for a second pivot axle (32) of the pivot mechanism (30), wherein the first axle receptacle (29*a*) and the second axle receptacle (29*b*) are in each case oriented so as to be substantially orthogonal to the rear wheel axle (A).

24. Rear derailleur (10) according to one of the preceding examples, where the derailleur includes an electromechanical drive (50) which is disposed in the region of the base element (20).

25. Method for adjusting a bicycle drive, including: a rear derailleur (10) according to one of the preceding examples, a multi-chain wheel assembly (4), a front chainring and a chain (5), wherein the rear derailleur (10) is adjusted relative to the multi-chain wheel assembly (4), said method including the following steps: a) determining a bicycle category; b) depending on the bicycle category, shifting to a reference sprocket (R), in particular to one of the central sprockets of the multi-chain wheel assembly (4), such that the chain (5) engages with the reference sprocket (R); c) depending on the bicycle category, selecting an adjustment position and adjusting the blocking device (100) to a first, second or third position; d) repositioning the blocking device (100) to the active setting such that the chain guide assembly (90) is established relative to the movable element (40); e) rotating the derailleur (10) rearward about the rear wheel axle (A) until the ideal chain tension is achieved.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A rear derailleur for a bicycle gearshift mechanism, comprising:
a base element attachable to a bicycle frame;
a movable element coupled to the base element and repositionable relative to the base element;
a chain guide assembly coupled to the movable element and pivotable relative to the moveable element about a pivot axle;
a pre-tensioning installation configured to pre-tension the chain guide assembly relative to the movable element about the pivot axle to an initial setting, wherein the chain guide assembly, counter to a tensioning force of the pre-tensioning installation, is pivotable from the initial setting about the pivot axle to various operating settings; and
at least one blocking device for blocking the chain guide assembly in at least one blocking setting, deviating from the initial setting, relative to the movable element, wherein the at least one blocking device has a blocking element which is repositionable between a passive setting in which said at least one blocking device releases the chain guide assembly relative to the movable element, and at least one active setting in which the at least one blocking device holds the chain guide assembly in the at least one blocking setting, and wherein the at least one blocking device has a first longitudinal axis, the blocking element has a second longitudinal axis, the first longitudinal axis and the second longitudinal axis are spaced apart from each other, and the first longitudinal axis and the second longitudinal axis run parallel to each other.

2. The rear derailleur of claim 1, wherein the chain guide assembly has at least one contact element in the form of an outer cage plate or an opening in the cage plate, which for blocking the chain guide assembly in the at least one blocking setting interacts with the blocking element or is able to be brought to engage with the blocking element.

3. The rear derailleur of claim 1, wherein the at least one blocking device is disposed, in a receptacle opening of the movable element.

4. The rear derailleur of claim 1, wherein the blocking element is repositionable in the direction of the pivot axle or parallel to the pivot axle.

5. The rear derailleur of claim 1, wherein the blocking element along a longitudinal axis is repositionable between the at least one active setting and the passive setting.

6. The rear derailleur of claim 1, wherein the at least one blocking device includes a pin housing for mounting the blocking element.

7. The rear derailleur of claim 6, wherein the blocking element, by a spring installation, is pre-tensioned to the passive setting.

8. The rear derailleur of claim 7, wherein the blocking element has a longitudinal axis, and the pin housing has a housing longitudinal axis, and the two longitudinal axes run so as to be mutually spaced apart and mutually parallel.

9. The rear derailleur of claim 8, wherein the blocking element is eccentrically mounted in the pin housing.

10. The rear derailleur of claim 9, wherein the blocking element is formed by a thrust pin which is configured having a contact face by way of which said thrust pin in the at least one blocking setting for blocking the chain guide assembly relative to the movable element engages in a form-fitting or force-fitting manner on an edge or an opening of an outer cage plate of the chain guide assembly.

11. The rear derailleur of claim 10, wherein the blocking element in a second blocking setting engages on a lower cage arm between a lower chain guide roller and the pivot axle, the second blocking setting is assumed for adjusting the rear derailleur relative to a multi-sprocket assembly.

12. The rear derailleur of claim 11, wherein the thrust pin for manual activation has a compression face/compression end.

13. The rear derailleur of claim 12, wherein the at least one blocking device, composed of the blocking element and the pin housing, is able to be mounted in a first position or in a second position on the movable element in a receptacle opening of the movable element.

14. A method for adjusting a bicycle drive including a rear derailleur, a multi-chain wheel assembly, a front chainring and a chain, wherein the rear derailleur is adjusted relative to the multi-chain wheel assembly, the method comprising:
   determining a bicycle category;
   depending on the bicycle category, inserting a blocking device into a moveable member of the rear derailleur in a first position or a second position;
   depending on the bicycle category, shifting to a reference sprocket, such that the chain engages with the reference sprocket;
   repositioning the blocking device to an active setting such that a chain guide assembly is established relative to a movable element of the rear derailleur; and
   rotating the rear derailleur rearward about a rear wheel axle until an ideal chain tension is achieved.

15. The method of claim 14, wherein the reference sprocket is one of the central sprockets of the multi-chain wheel assembly.

* * * * *